United States Patent [19]
Ohtsuka et al.

[11] Patent Number: 6,145,950
[45] Date of Patent: Nov. 14, 2000

[54] USER INTERFACE, PRINTING SYSTEM USING USER INTERFACE AND PRINT CONTROL METHOD

[75] Inventors: Naoji Ohtsuka; Kentaro Yano, both of Yokohama; Kiichiro Takahashi, Kawasaki; Hitoshi Nishikori, Inagi; Osamu Iwasaki, Tokyo; Daigoro Kanematsu, Yokohama; Hidehiko Kanda, Kawasaki, all of Japan

[73] Assignee: Canon Kabushiki Kaisha, Tokyo, Japan

[21] Appl. No.: 08/847,744

[22] Filed: Apr. 22, 1997

[30] Foreign Application Priority Data

Apr. 23, 1996 [JP] Japan ................................... 8-101716
Apr. 1, 1997 [JP] Japan ................................... 9-082972

[51] Int. Cl.$^7$ .................................................. B41J 2/205
[52] U.S. Cl. ......................................................... 347/15
[58] Field of Search .......................... 347/15, 19, 43, 347/14, 42; 358/298

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |

(List continued on next page.)

FOREIGN PATENT DOCUMENTS

| | | |
|---|---|---|
| 0 351 754 | 1/1990 | European Pat. Off. |
| 0 372 826 | 6/1990 | European Pat. Off. |
| 0 401 023 | 12/1990 | European Pat. Off. |
| 0 440 261 | 8/1991 | European Pat. Off. |
| 0 585 028 | 3/1994 | European Pat. Off. |
| 0 595 517 | 5/1994 | European Pat. Off. |
| 0 600 735 | 6/1994 | European Pat. Off. |
| 0 627 323 | 12/1994 | European Pat. Off. |
| 0 628 415 | 12/1994 | European Pat. Off. |
| 0 630 752 | 12/1994 | European Pat. Off. |
| 0 642 260 | 3/1995 | European Pat. Off. |
| 0 654 352 | 5/1995 | European Pat. Off. |
| 0 687 565 | 12/1995 | European Pat. Off. |
| 0 688 673 | 12/1995 | European Pat. Off. |
| 0 700 786 | 3/1996 | European Pat. Off. |
| 0 720 916 | 7/1996 | European Pat. Off. |
| 0 741 488 | 11/1996 | European Pat. Off. |
| 0 750 994 | 1/1997 | European Pat. Off. |
| 54-056847 | 5/1979 | Japan . |
| 59-123670 | 7/1984 | Japan . |
| 59-138461 | 8/1984 | Japan . |
| 60-071260 | 4/1985 | Japan . |
| 60-163571 | 8/1985 | Japan . |
| 2-031562 | 2/1990 | Japan . |
| 3-005156 | 1/1991 | Japan . |
| 3-051138 | 3/1991 | Japan . |
| 6-155758 | 6/1994 | Japan . |
| 6-199031 | 7/1994 | Japan . |
| 7052390 | 2/1995 | Japan . |
| 7144419 | 6/1995 | Japan . |

*Primary Examiner*—John Barlow
*Assistant Examiner*—Charles W. Stewart, Jr.
*Attorney, Agent, or Firm*—Fitzpatrick, Cella, Harper & Scinto

[57] ABSTRACT

A user interface for high-quality image output and an image processing apparatus utilizing the user interface which performs apparatus setting for appropriate printing by selecting a print medium and a print mode in accordance with the type of ink cartridge. When an exchangeable ink cartridge, containing YMCK color ink or ink having different ink densities from those of the YMCK color ink in approximately the same color hues, is attached to a printer, the type of the ink cartridge is discriminated by an ink cartridge ID, and available print media and appropriate output image types are displayed for user's selection based on the ID. Then print operation is set in accordance with instruction by the user.

23 Claims, 25 Drawing Sheets

U.S. PATENT DOCUMENTS

| | | | |
|---|---|---|---|
| 4,459,600 | 7/1984 | Sato et al. | 346/140 R |
| 4,463,359 | 7/1984 | Ayata et al. | 346/1.1 |
| 4,516,135 | 5/1985 | Todoh . | |
| 4,528,576 | 7/1985 | Koumura et al. . | |
| 4,558,333 | 12/1985 | Sugitani et al. | 346/140 R |
| 4,560,997 | 12/1985 | Sato et al. . | |
| 4,608,577 | 8/1986 | Hori | 346/140 R |
| 4,617,580 | 10/1986 | Miyakawa . | |
| 4,635,078 | 1/1987 | Sakurada et al. | 346/140 R |
| 4,723,129 | 2/1988 | Endo et al. | 346/1.1 |
| 4,740,796 | 4/1988 | Endo et al. | 346/1.1 |
| 4,860,026 | 8/1989 | Matsumoto et al. . | |
| 4,872,027 | 10/1989 | Buskirk et al. . | |
| 5,049,898 | 9/1991 | Arthur et al. . | |
| 5,097,343 | 3/1992 | Chiba et al. . | |
| 5,138,344 | 8/1992 | Ujita | 347/14 |
| 5,235,351 | 8/1993 | Koizumi | 346/140 R |
| 5,245,362 | 9/1993 | Iwata et al. | 346/140 R |
| 5,394,250 | 2/1995 | Shono . | |
| 5,448,274 | 9/1995 | Hirabayashi et al. | 347/86 |
| 5,579,446 | 11/1996 | Naik et al. | 347/43 |
| 5,604,520 | 2/1997 | Matsubara et al. | 347/43 |
| 5,625,384 | 4/1997 | Numata et al. . | |
| 5,625,397 | 4/1997 | Allred et al. . | |
| 5,714,990 | 2/1998 | Courtney . | |
| 5,729,259 | 3/1998 | Gotoh et al. . | |
| 5,739,828 | 4/1998 | Moriyama et al. . | |
| 5,742,306 | 4/1998 | Gompertz et al. . | |
| 5,805,180 | 9/1998 | Ebisawa et al. . | |
| 5,818,474 | 10/1998 | Takahashi et al. . | |
| 5,828,389 | 10/1998 | Yamaguchi et al. . | |
| 5,831,646 | 11/1998 | Kuronuma et al. . | |
| 5,854,642 | 12/1998 | Takahashi et al. . | |

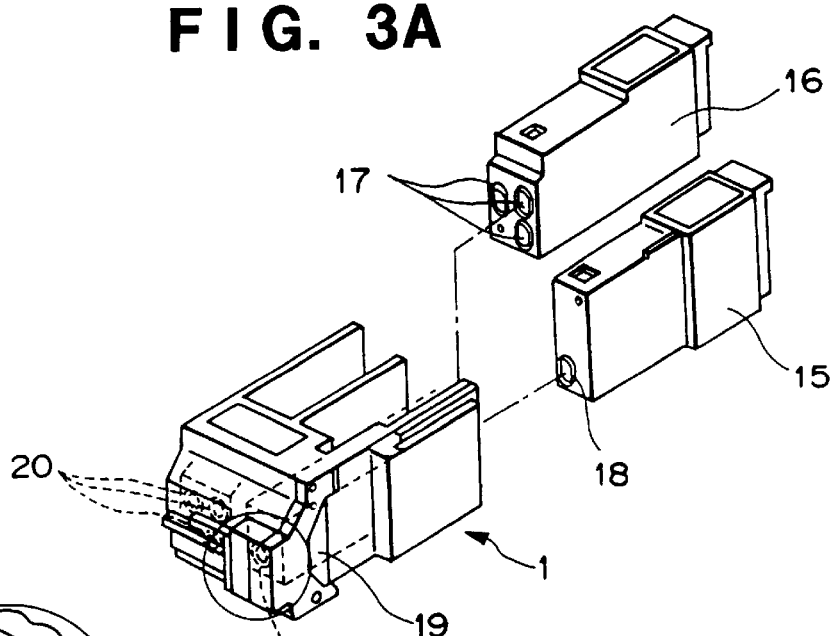
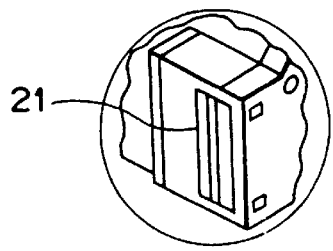
FIG. 3A
FIG. 3B

FIG. 7

| ID | PIGMENT CONCENTRATION | DATA | MAXIMUM INK-DISCHARGE AMOUNT | CORRESPONDING MEDIUM |
|---|---|---|---|---|
| 1 | Y 2.5%<br>M 3.0%<br>C 2.7%<br>K 2.6% | 360 × 360dpi<br>BINARY | C 100%　R 200%<br>M 100%　G 200%<br>Y 100%　B 200%<br>K 100% | NORMAL PAPER<br>COATED PAPER<br>PICTORIAL PAPER |
| 2 | Y 2.5%<br>M 1.0%<br>C 0.9%<br>K 1.3% | 360 × 360dpi<br>QUATERNARY | C 300%　R 400%<br>M 300%　G 400%<br>Y 100%　B 400%<br>K 200% | COATED PAPER<br>PICTORIAL PAPER |
| 3 | Y 2.5%<br>M 0.8%<br>C 0.7%<br>K 0.9% | 360 × 360dpi<br>QUINARY | C 400%　R 500%<br>M 400%　G 500%<br>Y 100%　B 500%<br>K 300% | PICTORIAL PAPER |

FIG. 11A

| VALUE | PATTERN |
|---|---|
| 0 | × |
| 1 | ○ |

BINARY DATA

◎ DISCHARGE 2 DOTS FOR 1 PIXEL
○ 1 DOT FOR 1 PIXEL
× NO DOT

FIG. 11B

| VALUE | | PATTERN | |
|---|---|---|---|
| 0 | 0 | × | × |
| 1 | 0 | ○ | × |
| 0 | 1 | ○ | ○ |
| 1 | 1 | ◎ | ○ |

QUATERNARY DATA

◎ DISCHARGE 2 DOTS FOR 1 PIXEL
○ 1 DOT FOR 1 PIXEL
× NO DOT

FIG. 11C

| VALUE | | | | PATTERN | |
|---|---|---|---|---|---|
| 0 | 0 | 0 | 0 | × | × |
| 0 | 0 | 0 | 1 | ○ | × |
| 1 | 1 | 0 | 0 | ○ | ○ |
| 1 | 1 | 1 | 0 | ◎ | ○ |
| 1 | 1 | 1 | 1 | ◎ | ◎ |

QUINARY DATA

◎ DISCHARGE 2 DOTS FOR 1 PIXEL
○ 1 DOT FOR 1 PIXEL
× NO DOT

FIG. 18

PRINT MODE
- ○ NORMAL MODE
- ○ PICTORIAL MODE 1
- ○ PICTORIAL MODE 2
- ○ MONOCHROME MODE

FIG. 19

SET NORMAL PAPER, COATED PAPER, OR PICTORIAL PAPER

FIG. 20

ATTACH INK CARTRIDGE FOR PICTORIAL MODE 1

CURRENT INK CARTRIDGE | FOR NORMAL MODE

FIG. 26A

DISPLAY A

ATTACH CARTRIDGE

FIG. 26B

DISPLAY B

PRINT MEDIUM
NORMAL PAPER
COATED PAPER
PICTORIAL PAPER

PRINT MODE
HQ
PHOTO1
PHOTO2

FIG. 26C

DISPLAY C

PRINT MODE
HQ
PHOTO1
PHOTO2

FIG. 26D

DISPLAY D

PRINT MEDIUM
NORMAL PAPER
COATED PAPER
PICTORIAL PAPER

FIG. 27

|  | ID = 1 | | | ID = 2 | | | ID = 3 | | |
|---|---|---|---|---|---|---|---|---|---|
|  | HQ | PHOTO1 | PHOTO2 | HQ | PHOTO1 | PHOTO2 | HQ | PHOTO1 | PHOTO2 |
| NORMAL PAPER | ○ | ○ | ○ |  |  |  |  |  |  |
| COATED PAPER | ○ | ○ | ○ |  | ○ | ○ |  |  |  |
| PICTORIAL PAPER | ○ | ○ | ○ | ○ | ○ | ○ | ○ | ○ | ○ |

USER INTERFACE, PRINTING SYSTEM USING USER INTERFACE AND PRINT CONTROL METHOD

CROSS-REFERENCE TO RELATED APPLICATIONS

This application is related to U.S. patent application Ser. No. 08/844,854, No. 08/844,740, No. 08/847,743, and No. 08/847,984, all filed on Apr. 22, 1997. All the applications are assigned to the assignee of this application and are incorporated herein by reference.

BACKGROUND OF THE INVENTION

This invention relates to a user interface, a printing system using the user interface and print control method and, more particularly to a user interface employed for forming various types of color images by an ink-jet method, a printing system and a print control method using the user interface.

Printers and printing units in copiers and facsimile apparatuses print an image comprised of a dot pattern on a print medium such as paper sheets or plastic thin films, based on image information. These printers and printer units use printing methods including the ink-jet method, a wire-dot method, a thermal-transfer method, a laser-beam method and the like. An ink-jet printer that employs the ink-jet method performs printing by discharging ink droplets from discharge orifices of a printhead onto a print medium.

In recent years, various types of printers have been widely used, and there are needs for high-speed printing, high-resolution printing, high image quality, low noise and the like. The ink-jet printer can be regarded as a printer that meets these requirements. Since the ink-jet printer performs printing by discharging ink from a printhead, it can perform printing avoiding contact with a print medium. This obtains quiet and very stable print-output.

By virtue of recent development of various digital cameras, digital video cameras, CD-ROMs and the like, pictorial image data can be easily handled by an application program on a host computer. The printer as the output device of the system is required to have an ability to output such pictorial images. Conventionally, a high-quality silver-chloride type printer which inputs digital image data and performs printing based on the input data, or an expensive sublimating type printer dedicated to picture output by using sublimation type dyes, have been mainly used to output pictorial images.

However, the printers for exclusively printing picture images are very expensive. One of the reasons for high prices of these printers is that the silver chloride method is employed as the printing method, which requires a very complicated image formation process and increases the printer size so as to preclude desktop use. Further, in the sublimating type printer using sublimation type dyes, as the size of available print medium increases, manufacturing and running costs of the printer main body greatly increase. Accordingly, such printers have not been suitable for home use. In addition, these printers are designed on the premise of using a particular print medium. That is, these printers, for a limited purpose, are not suitable for various types of printing as performed in domestic or general business environments. For example, in the above printers, it is impossible to print word-processed documents or graphic images on various types of print media, especially normal paper sheets, as usual printing, -and as specific printing, perform pictorial printing of picture images on a particular print medium.

In advanced printers, especially in the ink-jet printer, image quality of printed pictures is greatly improved due to improvement of image processing, coloring material, print media and the like.

In case of ink-jet printers, it becomes very common that one printer can selectively perform monochrome printing or color printing by employing a well-known exchangeable ink cartridge where a printhead and an ink tank are integrated. This type of printer has been made so as to attain most users' desire, i.e., enhancement of monochrome printing function for high-speed output of word-processed document images and color printing function for output of color-graphics, by using limited resources of one printer. The enhanced functions include an optimizing function to identify the type of an ink cartridge and switch print control appropriate for an ink cartridge for monochrome printing (monochrome ink cartridge) to/from print control appropriate for an ink cartridge for color printing (color ink cartridge), based on the identified type of ink cartridge. Note that at the present time, the exchange of ink cartridge is performed only for replacing monochrome ink by color ink and vice versa.

Further, in color output, various studies have been made for many years to improve tonality representation of color graphics printing. For this purpose, methods for enhancement have been proposed with respect to the printers, and they have been adopted at a practical stage. For example, to improve drawing capability, the print resolution for drawing can be increased to a higher level than that of ordinary color print mode. Otherwise, to increase the print resolution of the printer, it may be arranged to send multivalued data as print data to the printer and perform multivalue output by using subpixels.

Further, to perform pictorial image output by an ink-jet printer, there has been proposed from several years ago a printing method for printing a color image on a print medium by simultaneously using coloring materials, each having different pigment concentration. For example, the ink-jet printer generally uses four coloring materials of C (cyan), M (magenta), Y (yellow) and K (black) colors or three coloring materials of C, M and K colors. On the other hand, a printer, which performs printing by simultaneously using two types of coloring materials of different pigment concentrations with respect to each of the four C, M, Y, K or C, M, K colors, has been proposed. In this printer, a color representation range can be greatly widened, and further, with respect to a high-brightness area (area where print dots discretely exist on a print medium) in an image, graininess of the area can be greatly mitigated by performing printing with coloring materials of low pigment concentrations. Contrary, with respect to an area having low brightness and high chromaticness, an image of high color development where graininess is mitigated can be obtained by performing printing with coloring materials of high pigment concentrations.

However, in the above printing, it is necessary to hold various kinds of coloring materials within one printer, which causes complexity of the printing system. Further, as most users frequently perform monochrome printing, it is wasteful to always hold coloring materials of low pigment concentrations which are used on rare occasions. Furthermore, in consideration of the entire size of the printer, the size of the printhead cannot be increased over a predetermined size. This requires to shorten the print width or reduce the capacity of the ink tank per one coloring material.

The pigment concentration of a coloring material is determined by a necessary maximum density in the system to be designed, such that a necessary optical reflection density can be obtained from a maximum ink amount per a unit area on a print medium in the system. Generally, if the determination of pigment concentration is made so as to obtain the maximum chromaticness of a primary color defined by YMC color space, can be obtained by a maximum ink amount, approximately the maximum chromaticness of a secondary color, defined by RGB color space as mixture of two of the primary colors, can be obtained by respective maximum ink amounts of two primary colors. In case of widening the color representation range, to obtain the maximum chromaticness of a primary color by a maximum ink amount, the pigment concentration of the coloring material must be increased. This results in pictorial images showing very conspicuous graininess, on pictorial images, which never meets a requirement concerning image density in graphics image formation for business use.

Otherwise, to meet the above requirement, appropriate image density in pictorial image formation and in graphics image formation for business use can be obtained by decreasing pigment concentrations. In this case, ink amount is controlled such that the maximum ink amount of a primary color is twice (200%) of a normal ink amount (100%), and the maximum ink amount of a secondary color is four times (400%) of the normal ink amount. However, in a general ink-jet printer, as the maximum amount of coloring material is determined in accordance with the type of print medium, the number of available types of print media is limited. This limits the wide use of the ink-jet printer, and increases ink consumption amount, thus increasing running cost.

Further, more excellent image representation is becoming possible by using a plurality of inks of the same color having various ink densities. Also, it is becoming possible to use various types of print media in correspondence with various types of output images. For example, documents prepared in offices are generally made by monochrome-printing characters and graphs on so-called normal paper sheets used in copiers and the like. In case of printing natural pictures such as a photograph, it is preferable to use so-called coated paper as a print sheet from the point of image quality.

In this manner, as various types of ink can be used, various types of print media can be used, and various types of images can be printed, it is desired to perform image printing by using an appropriate combination of ink and a print medium in correspondence with the print purpose. However, it is troublesome for users to select appropriate ink and appropriate print medium in each printing since such selection increases operation procedure.

SUMMARY OF THE INVENTION

Accordingly, it is an object of the present invention to provide an ink-jet printer and an image processing method which easily selects an appropriate combination of a type of output image, ink and a print medium.

It is another object of the present invention to provide an ink-jet printer and an image processing method which obtains a high-quality image by using color processing and a print mode in correspondence with the type of ink.

It is still another object of the present invention to provide an ink-jet printer and an image processing method which reliably sets a print mode desired by a user.

It is still another object of the present invention to provide an ink-jet printer and an image processing method which prevents misprinting when a print mode inappropriate to the type of ink has been set, by notifying a user of the fact that the print mode is inappropriate.

It is still another object of the present invention to provide an ink-jet printer and an image processing method which obtains a high-quality output image by performing color processing appropriate to a print mode.

It is still another object of the present invention to provide an ink-jet printer and an image processing method which, upon printing by using low-density ink, obtains an image having approximately the same density as that of an image printed by using high-density ink.

According to one aspect of the present invention, the foregoing object is attained by providing an ink-jet printer having an image formation unit capable of forming an image by using different types of ink, each exhibiting particular color property, comprising: identifying means for identifying a type of ink; setting means for setting a print mode, based on the type of ink identified by the identifying means; color-processing means for performing color-processing in accordance with the print mode set by the setting means; and transfer means for transferring image data color-processed by the color-processing means, into the image formation unit.

According to another aspect of the present invention, the foregoing object is attained by providing an ink-jet printer comprising: identifying means for identifying a type of ink; notifying means for notifying a user of print modes which can be set, in accordance with the type of ink identified by the identifying means; setting means for selectively setting one of the print modes notified by the notifying means, in accordance with an instruction manually inputted by the user; color-processing means for performing color processing on input color image data in accordance with the print mode set by the setting means; and an ink-jet printing unit which performs image formation by using the ink, based on the color image data color-processed by the color-processing means, wherein the ink-jet printing unit can perform image formation by using different types of ink each exhibiting particular color property.

According to still another aspect of the present invention, the foregoing object is attained by providing an ink-jet printer including a carriage carrying one of exchangeable printheads for discharging different types of ink, each exhibiting particular color property, and driving means for supplying a driving condition according to the printhead carried by the carriage and driving the printhead, comprising: identifying means for identifying a type of ink; a controller which performs image processing in accordance with a first print mode automatically set, based on the type of ink identified by the identifying means; and a driver which performs color-processing in accordance with a second print mode based on a manual instruction from a user.

According to still another aspect of the present invention, the foregoing object is attained by providing an image processing method comprising: an identifying step of identifying a type of ink; a setting step of setting a print mode in accordance with the type of ink identified at the identifying step; a color-processing step of performing color processing in accordance with the print mode set at the setting step; and a transfer step of transferring image data color-processed at the color-processing step to an image formation unit.

According to still another aspect of the present invention, the foregoing object is attained by providing an image processing method comprising: an identifying step of identifying a type of ink; a notifying step of notifying a user of print modes which can be set, in accordance with the type of ink identified at the identifying step; a setting step of selectively setting one of the print modes notified at the notifying step, in accordance with an instruction manually inputted by the user; a color-processing step of performing color processing on input color image data in accordance with the print mode set at the setting step.

The present invention is particularly advantageous since a user can easily select an appropriate combination of a type of output image, ink and a print medium.

According to the present invention, a high-quality image can be obtained by using color processing and a print mode in accordance with the type of ink. Further, a print mode desired by the user can be reliably set.

Further, according to the present invention, when a print mode inappropriate to the type of ink has been set, misprinting can be prevented by notifying the setting error to the user.

Further, according to the present invention, a high-quality output image can be obtained by performing color processing appropriate to a print mode.

Further, according to the present invention, when printing is performed by using low-density ink, an image can be efficiently obtained with a density approximately the same as that of an image printed by using high-density ink.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 3A and 3B are an exploded view and an enlarged view showing the ink cartridge 1 in detail;

FIG. 7 is a table showing classified contents of control selectively executed by a controller unit of the printer 200 in accordance with an ID signal from the electrical contact 19 of the ink cartridge 1;

FIGS. 11A to 11C are tables respectively showing the relation between a dot pattern actually printed on a print medium by the printer 200 based on 360 dpi print data, and data structure;

FIGS. 18 to 20 are examples of messages displayed on a screen of the host 100 when a print mode is manually set;

FIGS. 26A to 26D are examples of selection menu images displayed on the screen of the host 100 upon setting a print mode and a print medium; and FIG. 27 is an LUT showing appropriate combinations of ID's of ink cartridge, types of output image and print media.

DETAILED DESCRIPTION OF THE PREFERRED EMBODIMENTS

First, the features of the embodiments will be described.

(1) At least one of an ink-discharge amount from a printhead and a maximum ink-discharge amount is changed in accordance with the combination of pigment concentrations, by identification of ink-cartridge ID or manual setting. Thus, at least one of the amount of coloring-material to be discharged on a print medium and its maximum value can be changed.

(2) As further enhanced example, in a case where coloring materials of relatively low pigment concentrations are used, color separation is performed per one pixel, into primary color components and secondary color components, and determining a maximum ink-discharge amount of coloring material per each primary or secondary color, instead of simply increasing the maximum ink-discharge amount of each coloring material in accordance with its pigment density ratio of the coloring material. Upon this determination, instead of simply increasing the maximum ink-discharge amount of each coloring material, each ink-discharge amount for each primary or secondary color is controlled such that each discharge amount is independently increased until it reaches the maximum ink-discharge amount. Accordingly, even though coloring materials of relatively low pigment concentrations are used, optical reflection densities approximately the same as those in use of high color-density coloring materials can be obtained. Further, this suppresses increase of the total ink-discharge amount and reduces running cost accompanying ink consumption.

(3) With respect to output from a color-processing module, which is typical one of the printer drivers, print data for respective colors can be selectively converted to binary data or multivalued data, in accordance with pigment concentrations of coloring materials. Further, in a print mode which requires more excellent tonality representation, an output function is provided for outputting multivalued data or high resolution data.

Preferred embodiments of the present invention will now be described in detail in accordance with the accompanying drawings.

General Embodiment

First, the construction of a printer, ink components and image processing, commonly used in the following embodiments will be described as a general embodiment.

Figure 1:
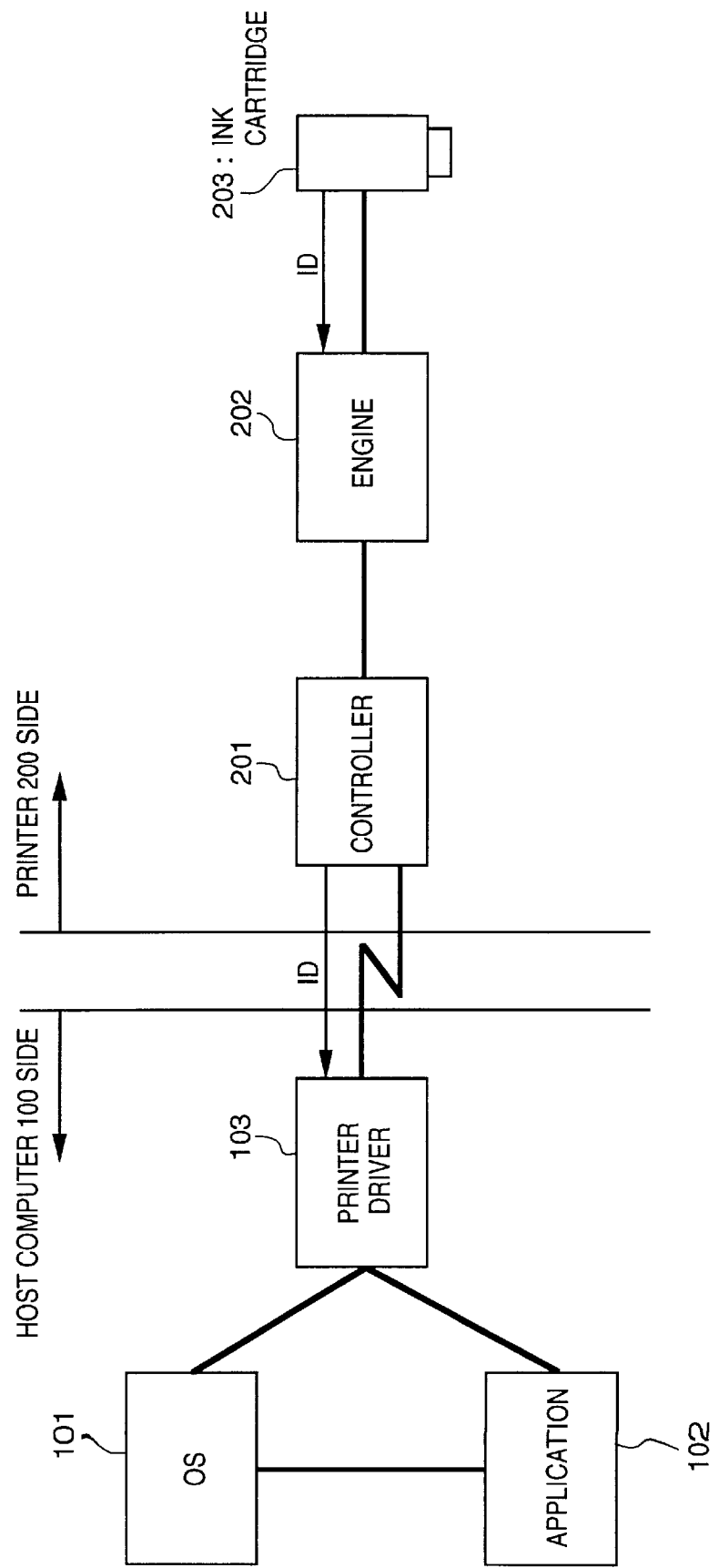
FIG. 1 is a block diagram showing the functional construction of a printing system, including a host computer (host) 100 and an ink-jet printer 200, as a representative embodiment of the present invention.

FIG. 1 shows the functional construction of a printing system, including a host computer (host) 100 and an ink-jet printer (printer) 200, as a representative embodiment of the present invention.

In FIG. 1, in the host 100, various data are exchanged and various controls are performed between an operating system (OS) 101 and an application software (hereinafter referred to as "application") 102 which runs on the OS 101. Print data is inputted/outputted among the OS 101, the application 102 and a printer driver 103, and is transferred to the printer 200 via the printer driver 103.

Next, the data flow in case of print-outputting a color image by the printer 200 using the application 102 which handles pictorial image will be described.

If image data generated and edited by the application 102 represents a pictorial image, the data is sent to the printer driver 103 as multivalued RGB signals. The printer driver 103 performs color processing on the multivalued RGB signals received from the application 102, and further performs halftone processing on the signals, thus converting the signals normally into binary C (cyan), M (magenta), Y (yellow) and K (black) signals. The printer driver 103 sends these signals to a printer interface unit for the printer 200, provided in the host 100, or an interface unit for a storage device provided for filing information or the like.

In the present embodiment, image data is sent via the printer interface unit to a software (hereinafter referred to as "controller") 201 for a controller unit, which runs on the controller unit of the printer 200. The controller 201 checks the print mode, matching between the image data and an ink cartridge 203, and forwards the image data to a software (hereinafter referred to as "engine") 202 for a printer engine which runs on the printer engine. The engine 202 receives the image data as having a data structure according to a print mode designated by the controller 201, converts the data into pulse signals for ink discharging, and outputs the pulse signals to a printhead of the ink cartridge 203. Then the printing is performed by discharging coloring materials (ink) from the printhead of the ink cartridge 203 based on the pulse signals. On the other hand, ID information of the ink cartridge 203, ink tank ID information and the like are sent to the engine 202. The engine 202 performs memory allocation and various optimizing operations based on the information from the ink cartridge 203. Further, the information is sent to the controller 201, and used, as a reference, for decoding data from the printer driver 103 together with the print mode and the like for decoding.

Figure 2:
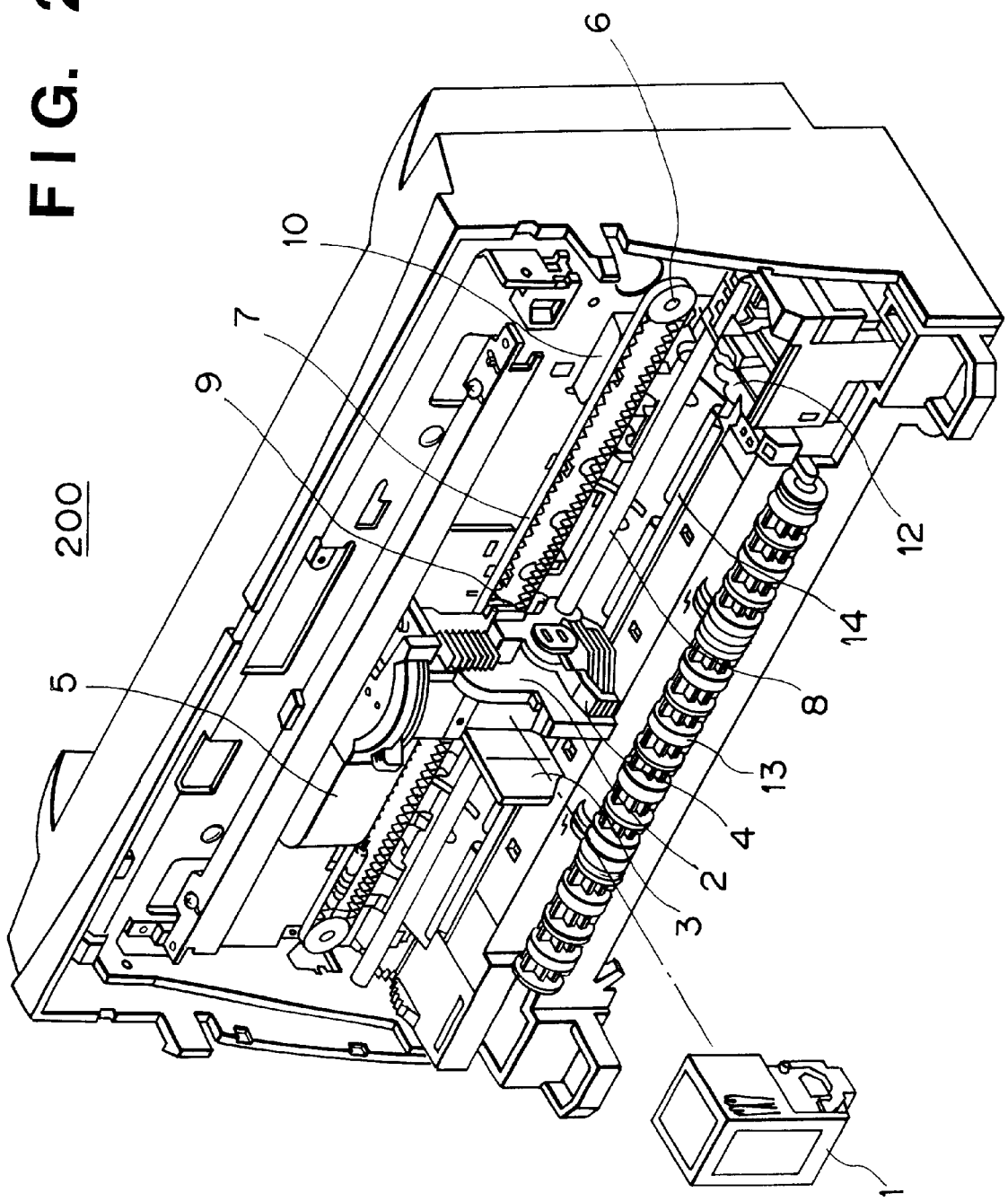
FIG. 2 is a perspective view showing the mechanical structure of the printer 200 which uses an exchangeable ink cartridge 1.

FIG. 2 shows the mechanical structure of the printer 200 using an exchangeable ink cartridge, according to the present embodiment. In FIG. 2, the front cover of the printer 200 is removed and the structure of the apparatus is shown.

In FIG. 2, numeral 1 denotes an exchangeable ink cartridge (corresponding to the ink cartridge 203 in FIG. 1), having a printhead and an exchangeable ink tank containing ink. Numeral 2 denotes a carriage unit to which the ink cartridge 1 is attached. The carriage unit 2 scan-moves in a main-scanning direction for printing. Numeral 3 denotes a holder for fixing the ink cartridge. The holder 3 operates interlocking with the operation of a cartridge fixing lever 4; that is, after the ink cartridge 1 has been attached to the carriage unit 2, the cartridge fixing lever 4 is turned, which presses the ink cartridge 1 to abut against the carriage unit 2. Thus positioning of the ink cartridge 1 is made, and electrical contact between the ink cartridge 1 and the carriage unit 2 is obtained. Numeral 5 denotes a flexible cable for transferring an electric signal to the carriage unit 2; 6, a carriage motor which rotates to scan the carriage unit 2 in the main-scanning direction; 7, a carriage belt driven by the carriage motor 6 to scan the carriage unit 2 in the main-scanning direction; 8, a guide shaft which slidably supports the carriage unit 2; 9, a home position sensor having a photocoupler for detecting the home position of the carriage unit 2; and 10, a light-shielding plate used for detecting the home position. When the carriage unit 2 has arrived at the home position, light to the photocoupler of the carriage unit 2 is blocked by the light-shielding plate 10, whereby it is detected that the carriage unit 2 has arrived at the home position. Numeral 12 denotes a home position unit, having a recovery mechanism and the like, which is applied to the printhead included in the ink cartridge 1; 13, a paper-discharge roller which discharges a print medium by holding the print medium between a gear unit (not shown) and the paper-discharge roller 13 and conveying the print medium to the outside of the printer; and 14, an LF (line feed) unit which conveys the print medium in a subscanning direction by a predetermined amount.

FIGS. 3A and 3B show the ink cartridge 1 in detail.

In FIG. 3A, numeral 15 denotes an exchangeable ink tank containing black (Bk) ink; 16, an exchangeable ink tank containing ink of respective C, M and Y coloring materials; 17, an ink supply port of the ink tank 16, which is connected to the ink cartridge 1 for supplying ink; and 18, an ink supply port of the ink tank 15. The ink supply ports 17 and 18 are connected to a supply pipe 20 for supplying ink to a printhead 21. Numeral 19 denotes an electrical contact connected to the above-described flexible cable 5, for transferring a signal based on print data to the printhead 21.

Figure 4B:
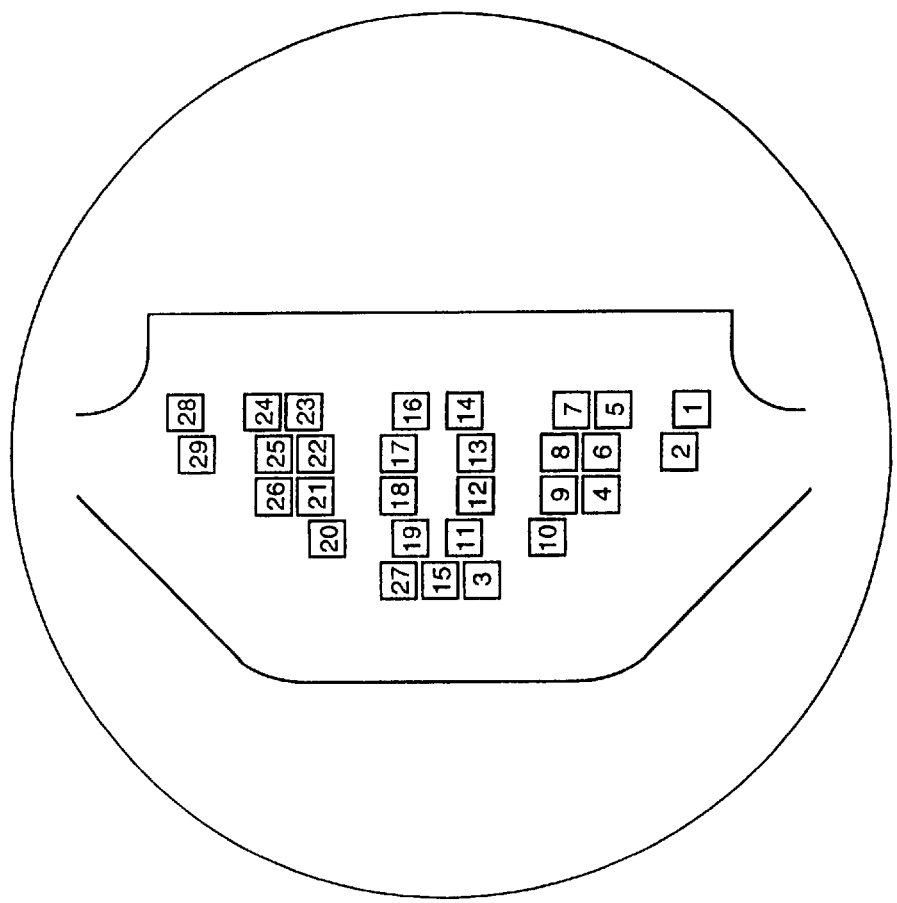
FIGS. 4A and 4B are a partial expanded view and an enlarged view showing an electric contact 19 of the ink cartridge 1.
Figure 4A:
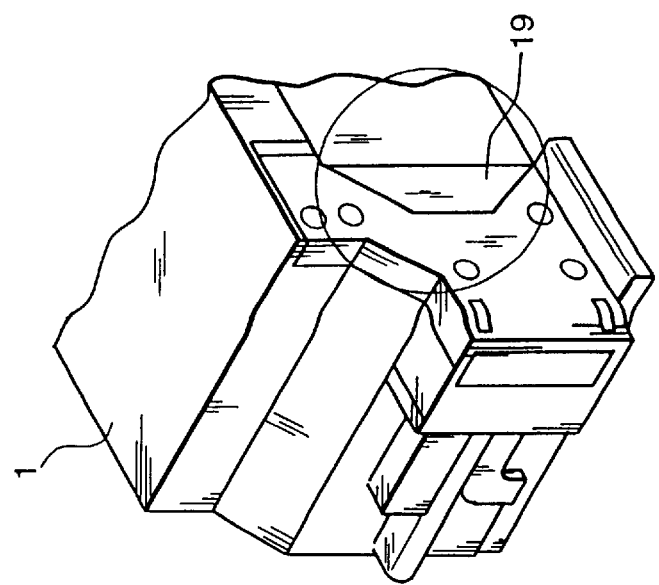

FIGS. 4A and 4B show the electrical contact 19 of the ink cartridge 1 in detail.

Signals initiating ink discharge, the ID signal for identifying the attached ink cartridge 1 or the ink tank and the like, are sent via the electrical contact 19, having a plurality of electrical pads, to the printer main unit.

Next, another method for detecting the type of the ink tank attached to the ink cartridge 1, according to the present embodiment, will be described with reference to FIGS. 5A and 5B.

Figure 5B:
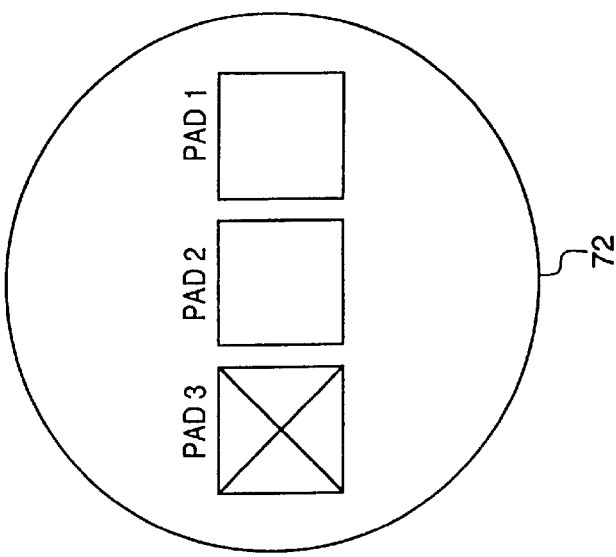
FIGS. 5A and 5B are a cross-sectional view and an enlarged view explaining another method for detecting the type of an ink tank attached to the ink cartridge 1.
Figure 5A:
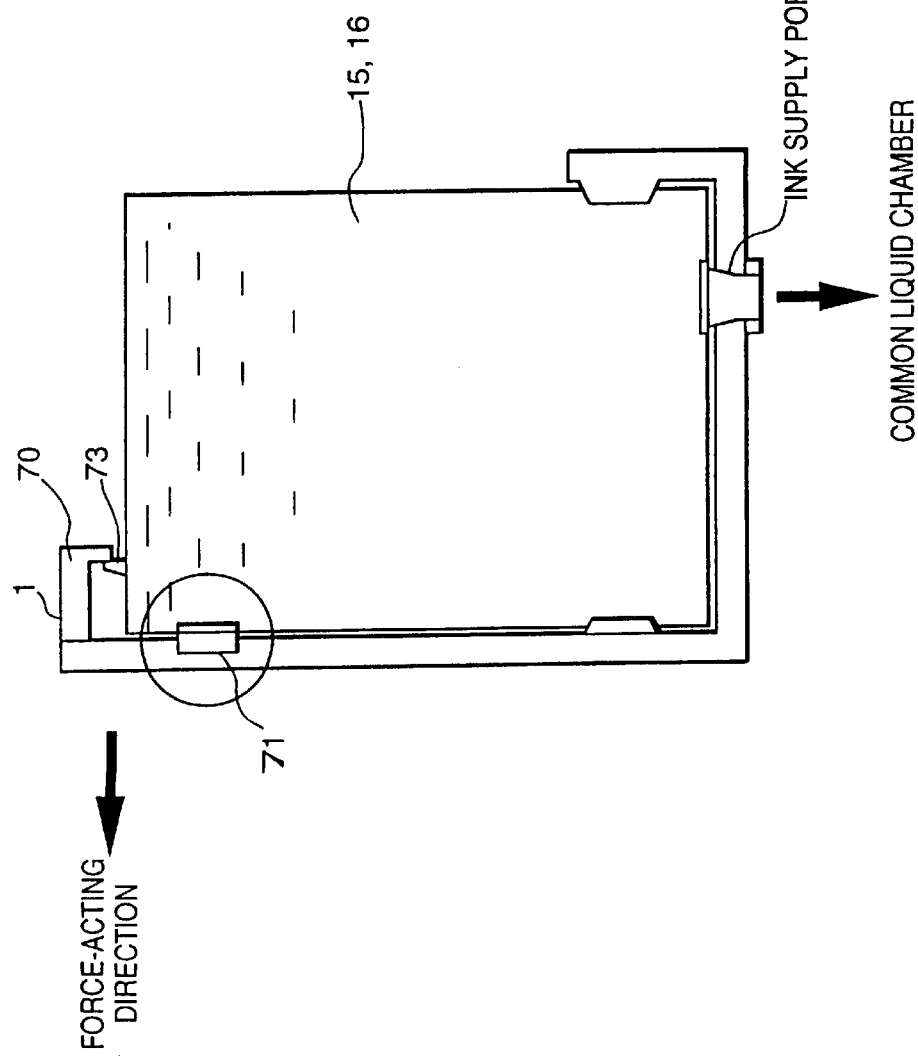

FIGS. 5A and 5B show the method for detecting the type of the ink tank attached to the ink cartridge 1.

When the ink tank 15/16 is attached to the ink cartridge 1, a hook 70 engages with a projection 73 of the ink tank, which fixes the ink tank on the ink cartridge 1. The ink cartridge 1 has a contact 71 for detecting the type of the attached ink tank in the force-acting direction of the hook 70. The contact 71 for detection of the type of ink tank is provided on both ink cartridge 1 side and ink tank 15/16 side. A circle 72 of FIG. 5B shows an expanded view of the contact 71 on the ink tank 15/16 side, in which three electrical pads 1 to 3 are provided in the contact 71. Although not shown in the circle 72, three electrical pads similar to the electrical pads 1 to 3 are also provided on the ink cartridge 1 side, and they are electrically connected to the contact 71. In the contact 71 on the ink tank 15/16 side, the conductive/insulated status of these electrical pads 1 to 3 indicate the type of ink contained in the ink tank. For example, the electrical pads 1 and 2 are conductive, while the electrical pad 3 is insulated, when the ink tank contains regular type of ink. The printer 200 can detect the type of ink contained in the attached ink tank by sending electric current to these electrical pads via the contact 71 on the ink cartridge 1 side.

That is, in the example in FIGS. 5A and 5B, electric current flows between the electrical pads 1 and 2 but does not flow between the electrical pads 1 and 3 and between the electrical pads 2 and 3. This status is stored in advance in a ROM or the like in the printer 200 as status indicating that a regular ink tank is attached. On the other hand, when an ink tank contains thin ink, the electrical pad 3 is conductive, for example. Thus, it can be detected that unusual ink tank is attached, from the status of the electrical pad 3.

Further, in the present embodiment, the number of electrical pads for identifying a type of an ink tank is three. However, by increasing the number of electrical pads, it is possible to identify more types of ink tanks.

Further, by examining conductive/insulated status via the electrical contact 19 as shown in FIGS. 4A and 4B, it can be detected whether or not the ink cartridge 1 or the ink tank has been changed.

Figure 6:
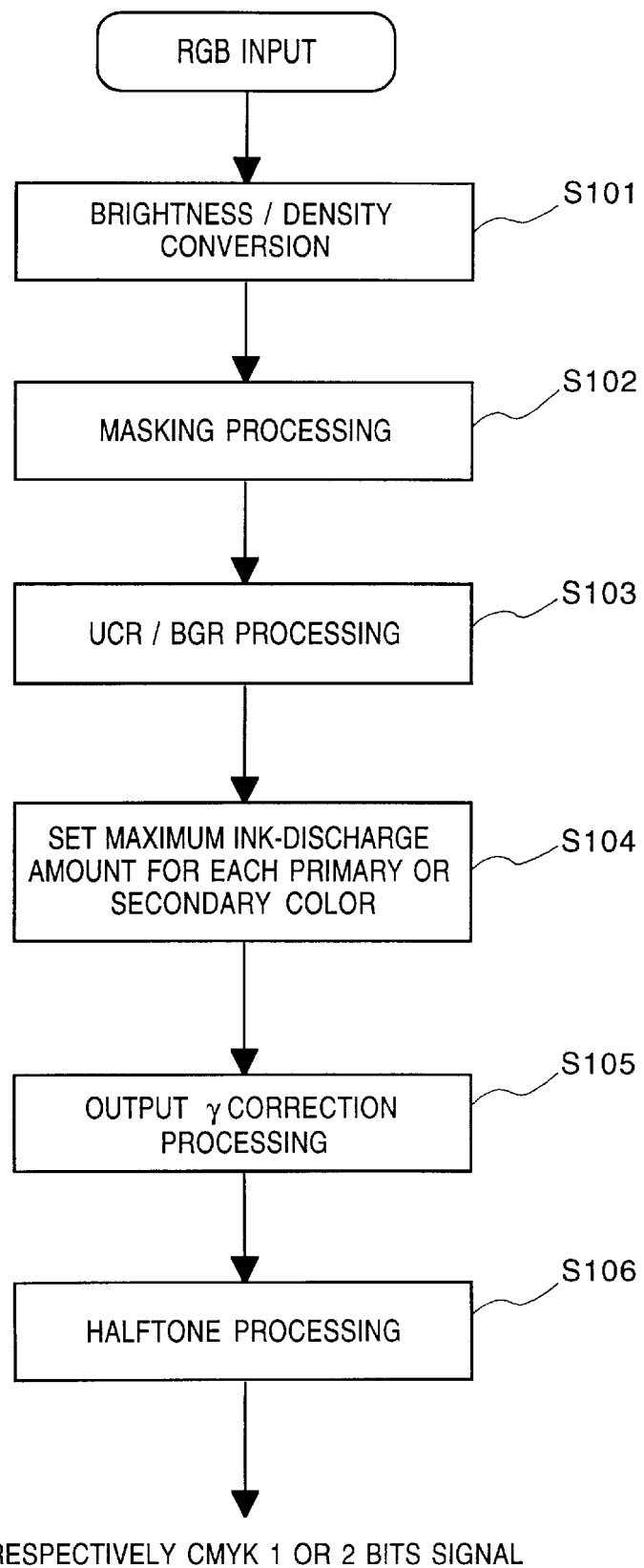
FIG. 6 is a flowchart showing an example of image processing by an image processing module in a printer driver 103.

FIG. 6 is a flowchart showing image processing by an image processing module in the printer driver 103 according to the present embodiment.

At step S101, brightness-density conversion is performed on input 24-bit RGB brightness signals, i.e., respectively 8-bit R, G and B signals, into 24-bit CMY density signals or 32-bit CMYK density signals. Next, at step S102, masking processing is performed on the signals so as to correct unnecessary color components reflected by pigment contained in the respective CMY coloring materials. At step S103, UCR (under color removal) processing and BGR (background) processing is performed so as to remove background color and extract black component. At step S104, a maximum ink-discharge amount is independently set by each pixel of a primary or secondary color. With respect to a primary color, the maximum ink-discharge amount is up to 300% (thrice) of an ink-discharge amount (100%) used for representation at the maximum chromaticness in normal printing. Similarly, with respect to a secondary color, the maximum ink-discharge amount is up to 400% of an ink-discharge amount (100%) used for representation at the maximum chromaticness in normal printing.

Next, at step S105, output γ-correction is performed to obtain linear output characteristic. Note that by this step, processings have been performed on each 8-bit multivalued data. Next, at step S106, halftone processing is performed on each 8-bit signal such that the CMYK data are converted into 1-bit or 2-bit signals. At this step, an error diffusion method or a dither method is applied to the halftone processing.

FIG. 7 shows classified contents of control selectively executed by the controller unit of the printer 200 in accordance with a head or ink identification signal (ID signal) of the ink tank from the electrical contact 19 of the ink cartridge 1.

In the present embodiment, though four types of ID's are used, FIG. 7 only shows three of them (color ink cartridges). ID "0" (not shown) indicates a monochrome ink cartridge; ID's "1" to "3", a color ink cartridge. In FIG. 7, control contents for color ink cartridges are classified. In this table, as the ID number becomes greater, the pigment concentration of at least one of coloring materials becomes lower.

As shown in FIG. 7, the pigment concentrations of color ink contained in the ink cartridges having different ID's are as follows.

ID=1 ink cartridge: yellow (Y) 2.5%; magenta (M) 3.0%; cyan (C) 2.7%; and black (K) 2.6%

ID=2 ink cartridge: yellow 2.5%; magenta 1.0%; cyan 0.9%; black 1.3%

ID=3 ink cartridge: yellow 2.5%; magenta 0.8%; cyan 0.7%; black 0.9%

In use of ink contained in the ID=1 ink cartridge, one pixel can be excellently represented, in yellow, by binary data; in magenta, by binary data; in cyan, by binary data; and in black, by binary data. In use of ink contained in the ID=2 ink cartridge, one pixel can be excellently represented, in yellow, by binary data; in magenta, by quaternary data; in cyan, by quaternary data; and in black, by binary data. In use of ink contained in the ID=3 ink cartridge, one pixel can be excellently represented, in yellow, by binary data; in magenta, by quinary data; in cyan, by quinary data; and in black, by ternary data.

Accordingly, when printing is performed by using the ID=1 ink cartridge, one-pixel print data comprises, for yellow component, 1 bit; for magenta component, 1 bit; for cyan component, 1 bit; and for black component, 2 bits. When printing is performed by using the ID=2 ink cartridge, one-pixel print data comprises, for yellow component, 1 bit; for magenta component, 2 bits; for cyan component, 2 bits; and for black component, 2 bit. When printing is performed by using the ID=3 ink cartridge, one-pixel print data comprises, for yellow component, 1 bit; for magenta component, 3 bits; for cyan component, 3 bits; and for black component, 2 bits.

In the printer 200, as described later, the concentration of a print buffer dynamically changes in correspondence with the ID of ink cartridge. When the ID=1 ink cartridge is attached, all the print buffers for respective color component data have a structure corresponding to a 1 bit/1 pixel data structure. When the ID=2 ink cartridge is attached, the print buffer for yellow component data corresponds to the 1 bit/1 pixel data structure, and the buffers for the other color component data, correspond to a 2 bits/1 pixel data structure. When the ID=3 ink cartridge is attached, the buffer for yellow component data corresponds to the 1 bit/1 pixel data structure, the buffers for magenta and cyan component data correspond to a 3 bits/1 pixel data structure, and the buffer for black component data corresponds to the 2 bits/1 pixel data structure.

As it is understood from the above buffer configuration, increase of print buffer capacity can be suppressed by reducing the tonality of yellow component having high brightness in print data.

In the present embodiment, the ID=1 ink cartridge (or ink tank) is an ink cartridge (or ink tank) containing color ink having pigment concentrations (high concentrations) used by conventional color printers. The ID=2 ink cartridge (or ink tank), employed in the present embodiment, contains color ink where pigment concentrations of coloring materials except yellow coloring material are low. The ID=3 ink cartridge (or ink tank), also employed in the present embodiment, contains color ink where pigment concentrations of coloring materials are lower than those of the ID=2 ink cartridge (or ink tank), for professional-like pictorial image printing.

In the present embodiment, the type of ink, i.e., the pigment concentrations of coloring material in an ink cartridge, as defined above, is identified based on the ID value of the attached ink cartridge. The difference in pigment concentration is difference in maximum optical reflection density in each primary color. To obtain this difference in pigment concentration, pigment itself can be changed. In this point, it can be considered that these ID values indicate the different maximum optical reflection densities of coloring materials with respect to each primary color, or different maximum chromaticness values. Note that for the sake of simplicity of explanation, it is simply assumed that the ID values indicate different pigment concentrations.

The pigment concentrations relationships between ID=1 and ID=2 ink are as follows. That is, in yellow (Y), the pigment concentrations of both ID=1 and ID=2 ink are the same (2.5%); in magenta (M) and cyan (C), the pigment concentration of ID=2 ink is ⅓ of that of ID=1 ink; and in black (K), the pigment concentration of ID=2 ink is ½ of that of ID=1 ink. The pigment concentrations relationships between ID=1 and ID=3 ink are as follows. That is, in yellow (Y), the pigment concentrations of both ID=1 and ID=3 ink are the same (2.5%); and in magenta (M), cyan (C) and black (K), the pigment concentration of ID=3 ink is approximately ¼ of that of ID=1 ink.

Figure 8:
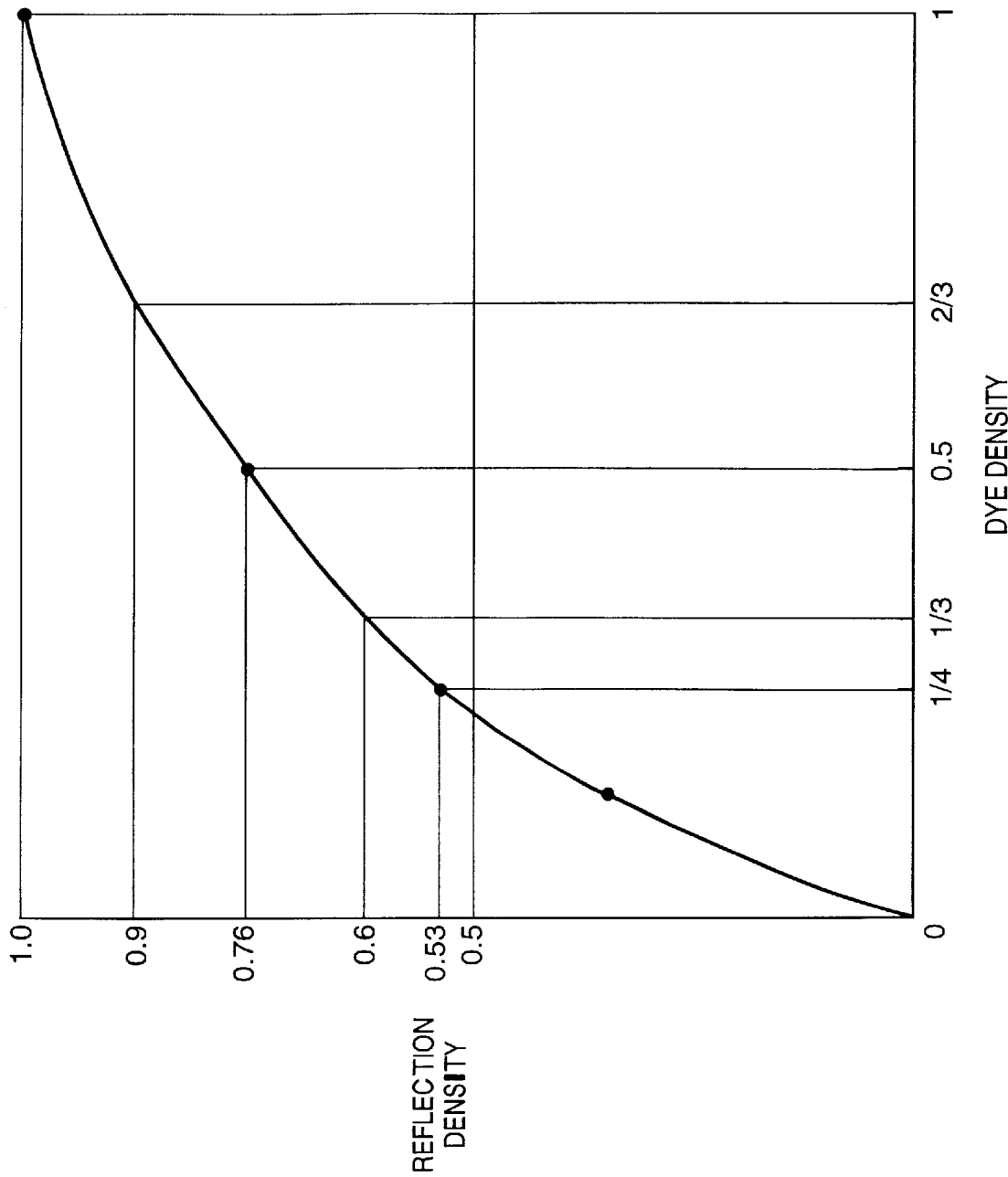
FIG. 8 is a graph showing the relation between pigment (dye) concentration and optical reflection density.

FIG. 8 shows the relation between pigment (dye) concentration and optical reflection density.

As shown in FIG. 8, in the present embodiment, when the pigment concentration becomes ½, the optical reflection density becomes about 76%; when the pigment concentration becomes ⅓, the optical reflection density becomes about 60%; when the pigment concentration becomes ¼, the optical reflection density becomes about 53%; and when the pigment concentration becomes ⅔, the optical reflection density becomes about 90%. This relation is obtained regardless of color.

Returning to FIG. 7, the cells "data" respectively show the depth of data structure sent from the printer driver 103 to the printer 200 in use of respective ID. The "depth" relates to the number of tone-levels representable by one pixel. As the depth is greater, the number of representable tone levels is greater. In FIG. 7, as the ID value is greater, the depth is greater. As the ID value changes, with the change in pigment concentration of the coloring material, the number of representable tone levels increases, and the maximum ink-discharge amount by the ink cartridge changes. The maximum ink-discharge amount is basically determined by the amount of discharged ink (coloring material, or precisely, pigment) per unit area on a print medium. This resides within the scope of the present invention. Note that in the present embodiment, regardless of ID value, printing is performed at 360×360 dpi printing resolution. The print data for ID "1" is binary data per 1 pixel; for ID "2", quaternary data per 1 pixel; and ID "3", quinary data per 1 pixel.

Further, as a modification to increase the number of tone levels, print data can be fixedly binary data with respect to each ID, while increasing the printing resolution. This obtains similar advantage.

Further, in FIG. 7, the cells of "corresponding media" show available media (print media) corresponding to the ink cartridge 1 of the respective ID's.

The reference for selecting these corresponding media can be set from various aspects; however, in the present embodiment, the selection is made based on the difference in maximum coloring-material absorptivity. In the present embodiment, a print medium for pictorial image printing (pictorial paper) has about 500% maximum coloring-material absorptivity; coated paper, about 400% maximum coloring-material absorptivity; and normal paper, about 200% maximum coloring-material absorptivity. Note that 100% comes from a maximum discharge amount for each ink.

Further, in FIG. 7, the cells of "maximum ink-discharge amount" respectively show maximum ink-discharge amounts in percentage different between CMYK and RGB. Each value indicates the maximum ink-discharge amount per each pixel handled by the printer driver 103. That is, in a portion where the same density is obtained by changing area densities of coloring materials for the respective color components, ink-discharge amounts are changed such that the amounts of pigments are approximately the same. In the present embodiment (in case of ID=2, 3), in comparison with the conventional printing (ID=1), it is characteristic that the maximum ink-discharge amount of a secondary (RGB) color is not twice of that of a primary (CMYK) color.

As it is understood from FIG. 7, the relation between "pigment concentration" and "maximum ink-discharge amount" is as follows.

In cyan (C), magenta (M) and yellow (Y) as chromatic colors, when the pigment concentrations of coloring materials of approximately the same color hue (approximately the same color) are compared between different IDs, the ratio between the coloring materials of high pigment concentration and that of low pigment concentration are obtained. Then, the maximum ink-discharge amount of a primary (CMYK) color is set in the obtained ratio or higher ratio, and the maximum ink-discharge amount of a secondary (RGB) color is set to be the sum of the maximum value and the minimum value of the ratio or greater.

For example, when the ID=1 ink cartridge and the ID=2 ink cartridge are compared, C and M coloring materials have the highest pigment concentration ratio in the approximately the same color hue. In this ratio, the maximum value of the M coloring materials is "3", and that of the C coloring materials is also "3"; and the minimum value of the Y coloring materials is "1". Accordingly, the sum of these maximum and minimum values is "4". In this case, the maximum ink-discharge amount is four times (3+1) or greater, i.e., 400%. Specifically, in case of ID=2, with respect to ID=1 case, the maximum ink-discharge amount of a primary (CMY) color is three times, i.e., 300%; the maximum ink-discharge amount of a secondary (RGB) color, four times, i.e., 400%.

By determining maximum ink-discharge amounts as above, in case of the primary C and M colors, the optical reflection densities can be approximately the same as those in case of ID=1 (ink cartridge containing color ink of high pigment concentrations). In case of the primary Y color, as the maximum ink-discharge amount is the same as that in case of ID=1, it can be 100%. That is, in the example of FIG. 7, when printing is performed by discharging ink of dye concentration ⅓ of that of ID=1 thrice, the amount of discharged dye is about thrice of that for one discharge. As water component such as dilution is absorbed in the print medium and it evaporates, approximately thrice optical reflection density can be obtained. Further, it is apparent from FIG. 8, when the pigment concentration value is ⅔ or greater, the reflection density is "0.9" or greater, it almost becomes saturated, thus, the difference between reflection densities becomes almost inconspicuous.

Next, the maximum ink-discharge amounts in case of the secondary colors (red (R), green (G) and blue (B)) will be described. The maximum ink-discharge amounts of these secondary colors correspond to ink absorptivities of the corresponding print media. As described above, normal paper has the lowest ink absorptivity; coated paper has a higher ink absorptivity; and pictorial paper has the highest ink absorptivity. In the example of FIG. 7, in accordance with these ink absorptivities, the maximum ink-discharge amount in use of normal paper is 200%; in use of coated paper, 400%; and in use of pictorial paper, 500%.

Hereinafter, the maximum ink-discharge amounts for respective RGB components in case of ID=2 will be further described.

Regarding R color, it is represented by using pigments (M+Y) of ink. As described above or as shown in FIG. 7, since Y component has a high pigment concentration (high brightness), the maximum ink-discharge amount is 100%. On the other hand, the maximum ink-discharge amount for M component is set to 300%. Accordingly, the maximum ink-discharge amount for R color, i.e. M+Y components, is 400%, and an optical reflection density approximately the same as that in case of ID=1 can be obtained. Similarly, regarding G color, represented by (C+Y) components, as the maximum ink-discharge amount for C component is set to 300%, the maximum ink-discharge amount for G color is 400%, and an optical reflection density approximately the same as that in case of ID=1 can be obtained. Further, regarding B color represented by (C+M) components, the maximum ink-discharge amount for B color is 600% (300%+300%). However, it is noted that the theoretically actual optical reflection density does not increase in spite of increase in the ink-discharge amount. Accordingly, it is preferable that the maximum ink-discharge amount for B color is 400% (C+M=200%+200%) in practice. In this case, the optical reflection density of print pixel is about 90% of that in use of ID=1 ink cartridge.

In a case where the ID=3 ink cartridge is used, similar calculation is made. That is, from the relation between the ID=1 and ID=3 ink, the maximum ink-discharge amount is 400% with respect to the primary (CMY) colors, and 500% or higher with respect to the secondary (RGB) colors. In this case, regarding the secondary colors other than B color, an optical reflection density approximately the same as that in case of ID=1 is obtained. In B color, if the maximum ink-discharge amount is 50%, as the optical reflection density is a little lower than that in case of ID=1, the maximum ink-discharge amount for the secondary B color may be 600%. In any way, the "corresponding media" are limited by changing the maximum ink-discharge amounts, as shown in FIG. 7. Accordingly, when a more pictorial image is desired, the pigment concentrations may be lowered, and the maximum ink-discharge amounts may be changed in accordance with the pigment concentrations, and "medium" optimized for pictorial image printing may be used.

Figure 9:
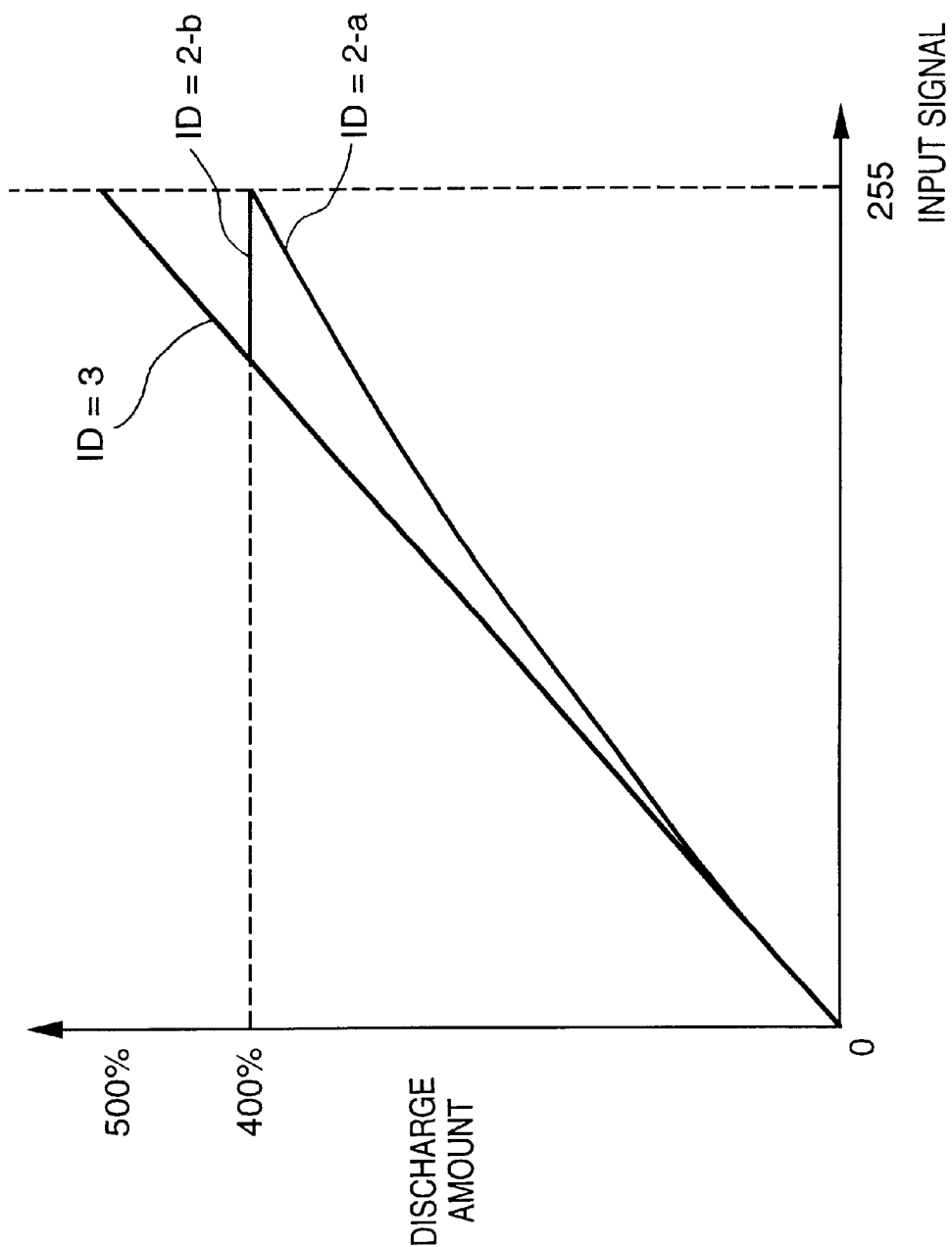
FIG. 9 is a graph showing the relation between an input density signal and an ink-discharge amount.

As described above, the greatest advantage can be obtained by changing the maximum ink-discharge amounts. In practice, even though the maximum ink-discharge amounts with respect to the print medium cannot be ideally changed, it may be designed such that regarding ink-discharge amount determined with respect to an input density signal, density data indicating a high density is clipped (ID=2–b), otherwise, the ink-discharge characteristic is set to a level (ID=2–a) a little lower than an ideal characteristic (ID=3) by using a higher-order curve, as shown in FIG. 9.

Further, in the case where the increase in ink-discharge amount is suppressed by clipping, similar advantage can be obtained by a certain tone level. In this case, up to the clipped level, approximately similar level of pigment concentration per unit area can be maintained regardless of coloring material.

Figure 10A:
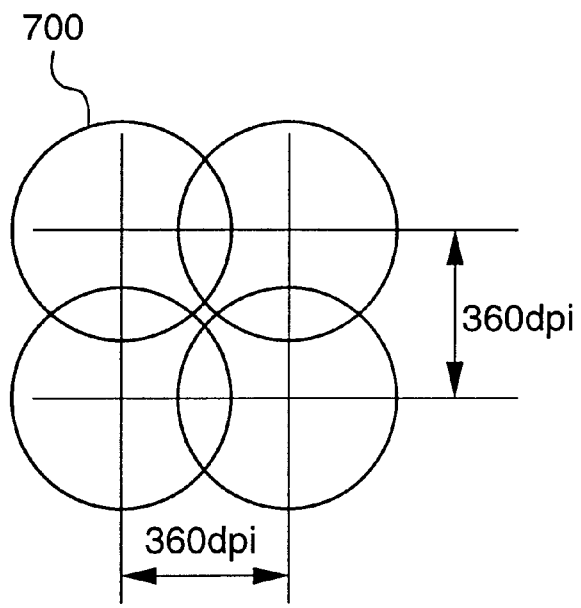
FIGS. 10A and 10B are explanatory views respectively showing the arrangement of dots to be printed.
Figure 10B:
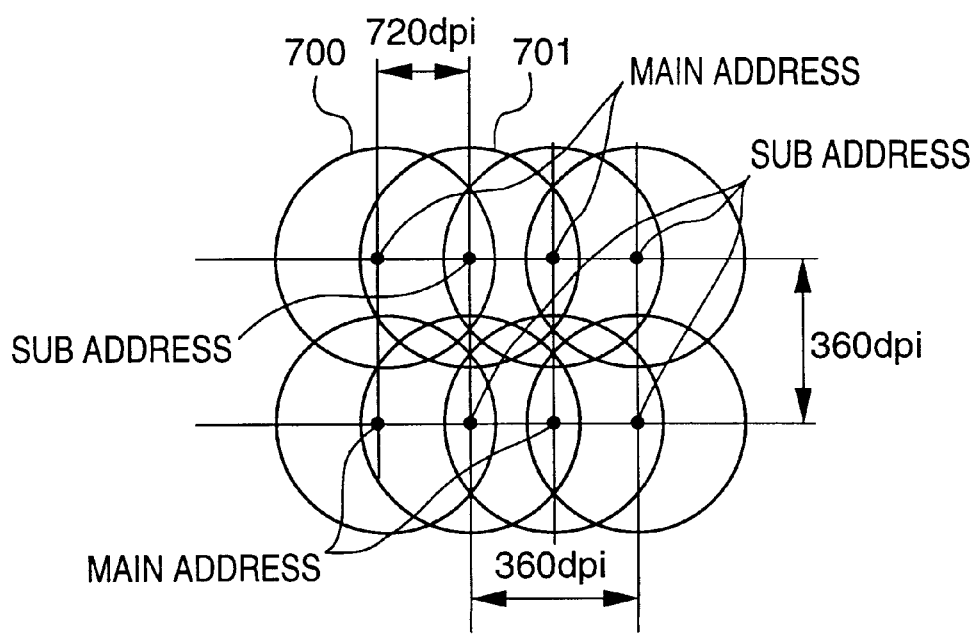

FIGS. 10A and 10B respectively show the arrangement of dots to be printed.

FIG. 10A shows the arrangement of dots on a print medium in case of printing in 360×360 dpi resolution based on binary data. FIG. 10B shows the arrangement of dots on the print medium in case of 360× 360 dpi printing based on quaternary or quinary data. In FIGS. 10A and 10B, respective circles (○) represent dots formed by respective color ink.

In case of FIG. 10A, dot formation for one pixel is made by 100% ink-discharge amount. In case of FIG. 10B, dot formation for one pixel is made by 200% ink-discharge amount. Note that in any case of binary data, quaternary data, and quinary data, when ink-discharge amounts are changed in accordance with the type of ink cartridge, in other words, in accordance with pigment concentrations of ink, it may be arranged such that even if all the dots corresponding to the respective pixels exist, ink discharge is performed by values obtained by multiplying ink-discharge amounts used in the dot formation as shown in FIGS. 10A and 10B with pigment concentration ratios between old and new ink cartridges due to a change of an ink cartridge.

FIGS. 11A to 11C respectively show the relation between a dot pattern actually printed on a print medium by the printer 200 based on 360 dpi print data, and data structure of the print data. For the sake of simplicity of explanation, a dot pattern for monochrome printing will be described here.

FIG. 11A shows a dot pattern in a case where the print data is binary data; FIG. 11B, a dot pattern in a case where the print data is quaternary data; and FIG. 11C, a dot pattern in a case where the print data is quinary data. Based on the binary data, printing is performed with the dot pattern as shown in FIG. 10A. In this case, as each pixel data corresponds to each printed dot, when the value of a pixel data is "0", no dot is printed at the corresponding dot position. When the value of a pixel data is "1", one dot is printed at the corresponding dot position in 360×360 dpi resolution. In the present embodiment, this printing is performed when the ID=1 ink cartridge is attached.

The dot pattern as shown in FIG. 11B is used in printing based on quaternary data when the ID=2 ink cartridge is attached. Each quaternary value is represented by a combination of two dots. That is, one dot is printed at a main address corresponding to 360×360 dpi resolution, e.g., a dot position 700 in FIG. 10B, while the other dot is printed at a subaddress corresponding to 720×360 dpi resolution, e.g., a dot position 701 in FIG. 10B. The quaternary data is provided as 2-bit signal. That is, when the value of a 2-bit signal is "00", no dot is printed. When the value of a 2-bit signal is "01", one dot is printed at a main address corresponding to 360×360 dpi resolution. When the value of a 2-bit signal is "10", one dot is printed at a main address corresponding to 360×360 dpi resolution (e.g., the dot position 700), and one dot is printed at a subaddress corresponding to 720×360 dpi resolution (e.g., the dot position 701). Accordingly, in this case, as ink discharge is made twice at approximately the same position, in comparison with the dot arrangement in 360×360 dpi resolution as shown in FIG. 10A, the ink-discharge amount at this position is 200%. Further, when the value of a 2-bit signal is "11", two dots are overlap-printed at a main address corresponding to 360×360 dpi resolution (e.g., the dot position 700), and one dot is printed at a subaddress corresponding to 720×360 dpi resolution (e.g., the dot position 701). Accordingly, in this case, as ink discharge is made thrice at approximately the same position, in comparison with the dot arrangement in 360×360 dpi resolution as shown in FIG. 10A, the ink-discharge amount at this position is 300%.

FIG. 11C shows a dot pattern in a case where the print data is quinary data given as 4-bit data. Note that this pattern is only one example and quinary value can be represented by using other patterns. In the dot pattern in FIG. 11C, the difference from the dot pattern in FIG. 11B is that upon printing based on the value of quinary data "1111", two dots are overlap-printed at a main address corresponding to 360×360 dpi resolution (e.g., the dot position 700 in FIG. 10B), and two dots are overlap-printed at a subaddress corresponding to 720×360 dpi resolution (e.g., the dot position 701 in FIG. 10B). Thus, in case of quinary data, the maximum 400% ink discharge is made for a primary color.

Note that as described above, as two dots must be overlapped at one pixel position so as to increase the number of representable tone levels, well-known multi-path printing is necessary.

Further, as a modification, the density of print-element arrangement may be increased, depending on a type of an ink cartridge. Furthermore, multi-path printing may be employed in addition to increase in the density of print-element arrangement so as to increase tonality representation capability. For example, in a case where an ink cartridge having print elements arranged in 360 dpi pitch is used, to increase the number of tone levels, the ink cartridge can be replaced with an ink cartridge having print elements arranged in 720 dpi pitch.

As another modification, at step S106 in FIG. 6, resolution conversion and binarization processing may be performed in accordance with the type of ink cartridge, so that 1-bit signals are always sent to the printer for respective CMYK colors.

Figure 12:
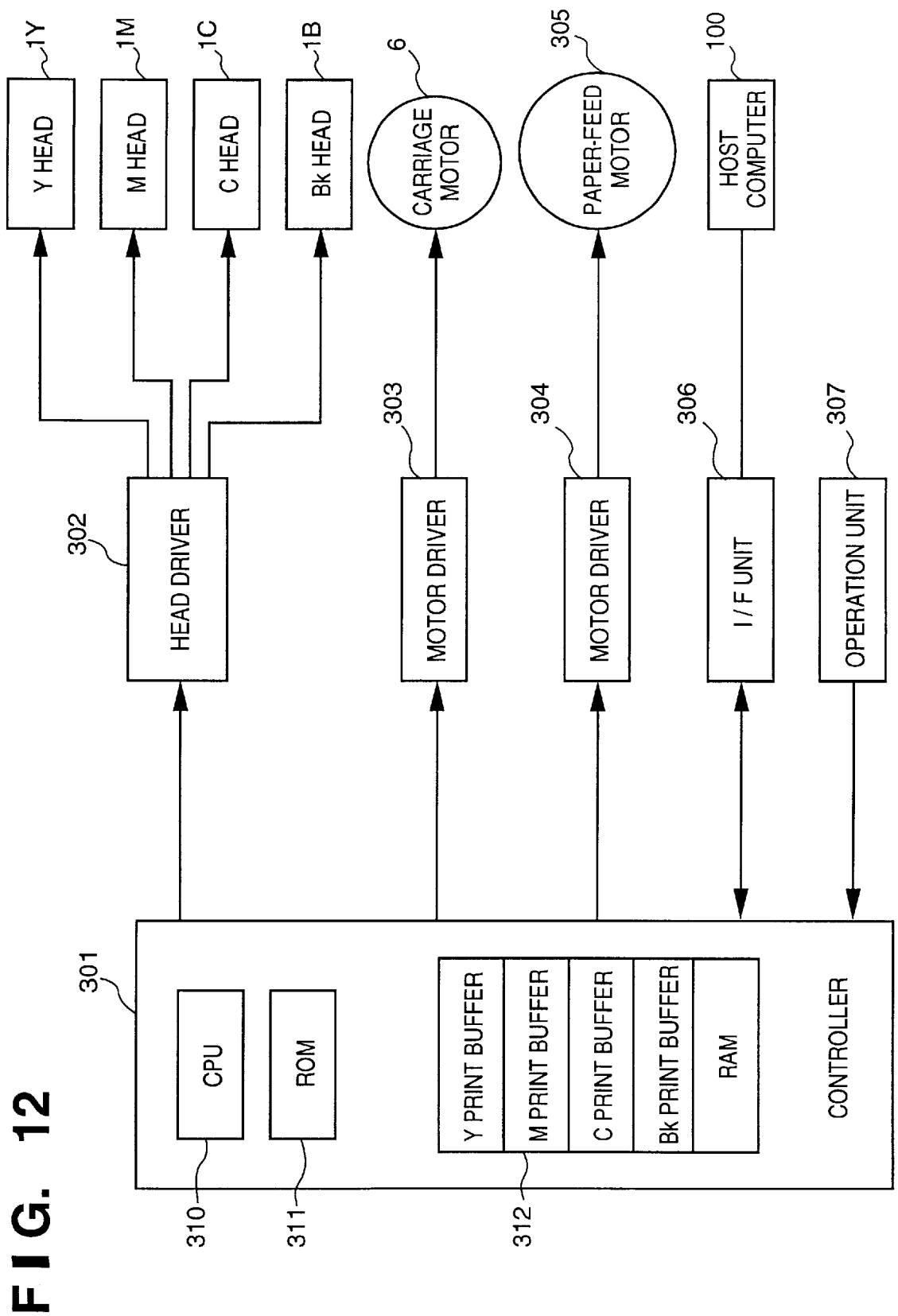
FIG. 12 is a block diagram showing the control construction of the printer 200.

FIG. 12 shows the control construction of the printer 200. Note that the elements already referred to have the same reference numerals.

Numeral 301 denotes a control unit which controls the overall operation of the apparatus. The control unit 301 has a CPU 310 such as a microprocessor, a ROM 311 in which control programs executed by the CPU 310 and various data are stored, a RAM 312 used as a work area upon execution of various processings by the CPU 310, and used for temporarily storing various data, and the like. The RAM 312 has a reception buffer for storing print data received from the host 100, and print buffers corresponding to Y, M, C and K color components for storing print data (image data) in correspondence with printheads 1Y, 1M, 1C and 1B which perform printing by discharging respective YMCBk color ink.

Note that FIG. 12 shows these print buffers as Y print buffer, M print buffer, C print buffer and B print buffer.

Numeral 302 denotes a head driver which drives the printhead 1Y for discharging yellow ink, the printhead 1M for discharging magenta ink, the printhead 1C for discharging cyan ink, and the printhead 1B for discharging black ink, in accordance with respective color print data output from the control unit 301; 303 and 304, motor drivers which respectively drive the carriage motor 6 and a paper-feed motor 305; 306, an interface (I/F) unit which controls interface between the printer 200 and the host 100; 307, an operation unit having various keys manipulated by a user and display devices such as an LCD.

Hereinbelow, several embodiments of print control using the printer having the above construction will be described.

First Embodiment

Figure 13:
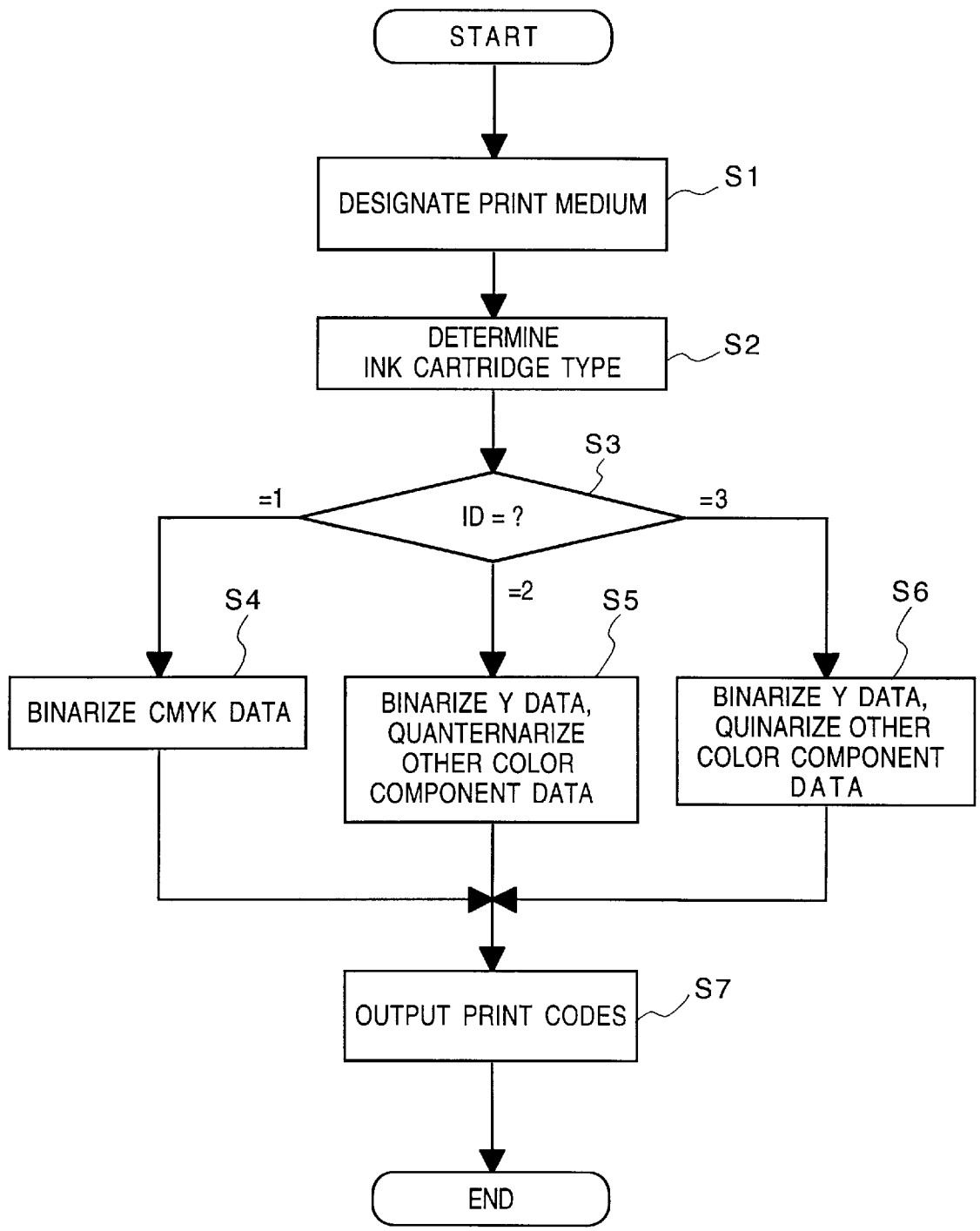
FIG. 13 is a flowchart showing print-data generation processing executed by the host 100, according to a first embodiment of the present invention.

FIG. 13 is a flowchart showing print-data generation processing executed by the host 100, according to a first embodiment of the present invention. This processing is performed by the printer driver 103.

At step S1, a print medium used by the printer 200 is designated. At step S2, the type (ID) of the ink cartridge 1 attached to the printer 200 is determined based on a signal from the printer 200. The designation of print medium and determination of ink cartridge type are made by, e.g., setting a mode of the printer 200 and the like in a displayed window on a display (not shown) connected to the host computer 100, under the control of the OS 101 of the host 100.

Next, at step S3, in accordance with the type of the ink cartridge 1 attached to the printer 200, if ID=1, the process proceeds to step S4, at which well-known binarization processing is performed on image data of respective color components.

At step S3, if it is determined that ID=2, the process proceeds to step S5, at which Y component data is binarized, and print data of other color components are quaternarized. Further, at step S3, if it is determined that ID=3, the process proceeds to step S6, at which the Y component data is binarized, and the print data of the other color components are quinarized. Thus, at step S7, print codes are generated based on the print data converted at any of steps S4 to S6, and the print codes are transferred to the printer 200. The printer 200 receives the print codes via the interface unit 306.

Figure 14:
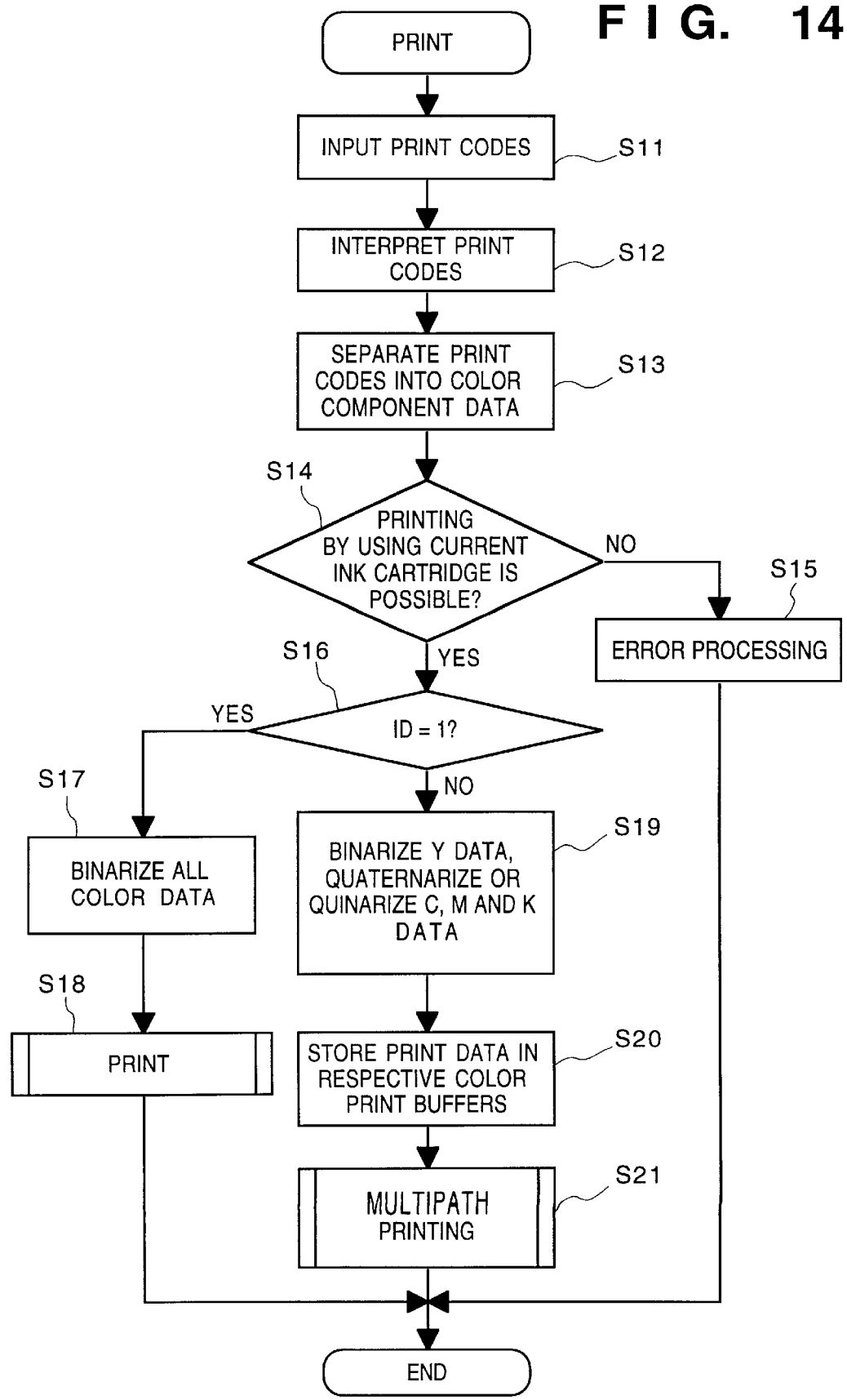
FIG. 14 is a flowchart showing print control executed by the printer 200.

FIG. 14 is a flowchart showing print control executed by the printer 200. The control program for executing this processing is stored in the ROM 311.

At step S11, the print codes received from the host 100 and stored into the reception buffer are read out, and at step S12, the read print codes are interpreted. Next, at step S13, in accordance with the results of interpretation, the print codes are converted into print data corresponding to the respective colors. At step S14, it is determined whether or not printing is possible based on the print data by using the currently attached ink cartridge 1. If it is impossible, the process proceeds to step S15 at which error processing such as displaying an error message on the operation unit 307 is performed, and the process ends.

If it is determined at step S14 that printing using the currently attached ink cartridge 1 is possible, the process proceeds to step S16, at which it is examined whether or not the ID is "1". If YES, the process proceeds to step S17, at which all the color component data is converted into binary print data and mapped in the print buffer, and at step S18, normal one-path printing is performed.

On the other hand, if it is determined at step S16 that the ID is not "1", the process proceeds to step S19, at which only the Y component data is binarized, and data of the other color components is quaternarized or quinarized. Note that this processing may be uniquely performed on print codes, otherwise, the processing may be performed based on the ID of the attached ink cartridge, independently of the host 100.

Thereafter, the process proceeds to step S20, at which the print data bitmapped for respective colors is stored into the print buffers in correspondence with respective colors. At step S21, printing is performed based on the multivalued data, by multi-path print control as described with reference to FIGS. 10A and 10B, and FIGS. 11A to 11C.

Figure 15:
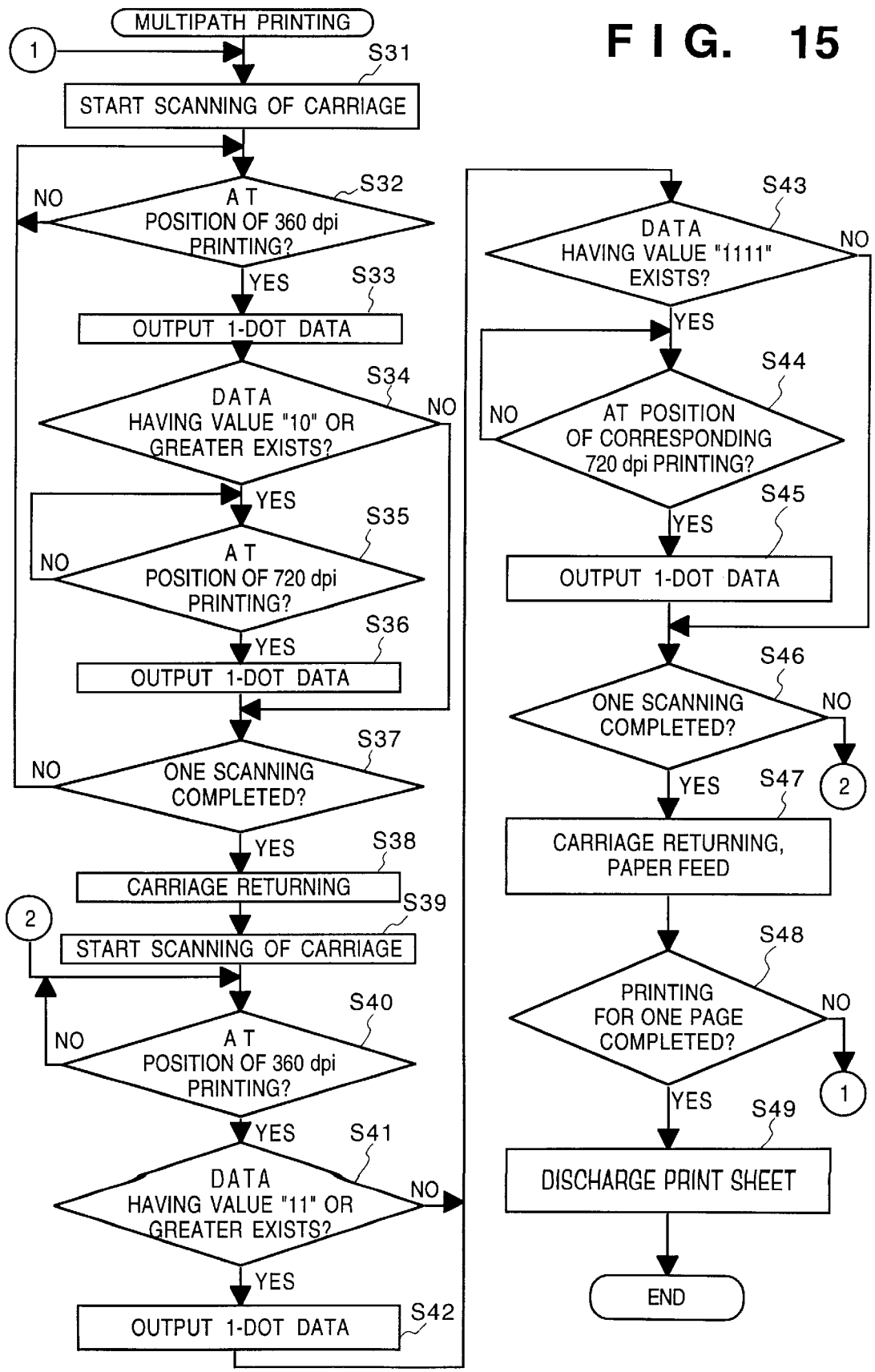
FIG. 15 is a flowchart showing in detail print processing by multi-path print control.

FIG. 15 is a flowchart showing in detail print processing by multi-path print control (step S21).

At step S31, drive of the carriage motor 6 is started, and at step S32, print data of respective color components to be printed is read out of the print buffers for the respective color components, and it is determined whether or not it is ready to print a dot in 360 dpi resolution, i.e., the carriage has arrived at the 360 dpi printing position. In this printing, a dot is formed at a main address (e.g., at the dot position 700) as described in FIG. 10B. When it has become the print timing, the process proceeds to step S33, at which the print data corresponding to the respective colors is outputted via the head driver 202 to the head 1Y, 1M, 1C and 1B, and a dot is printed at the above position, in accordance with the values of print data. Next, the process proceeds to step S34, at which it is examined whether or not any of the data of color components other than the Y color component, i.e., C, M and K color component data has a value "10" or greater. If there is no data having the value "10" or greater, it is determined that the printing has been for only one dot, as shown in FIG. 10A, then the process proceeds to step S37.

On the other hand, if there is data having the value "10" or greater, the process proceeds to step S35, at which it is determined whether or not it is ready to print a dot at a subaddress corresponding to 720 dpi resolution. If YES, the process proceeds to step S36, at which printing is performed by outputting the print data to the print heads 1M, 1C and 1B to discharge ink of corresponding colors. The process proceeds to step S37, at which it is determined whether or not printing for one scanning has been completed. If NO, the process returns to step S32 to repeat the above-described processing.

If it is determined at step S37 that printing for one scanning has been completed, the process proceeds to step S38, at which carriage returning, i.e., reversing the carriage motor 6 is performed to return the printhead to the home position. At step S39, the carriage motor 6 is reversed again (rotated in the initial "forward" drive direction). At step S40, it is determined whether or not the carriage has arrived at a printing position corresponding to 360 dpi resolution, similar to step S32. If YES, the process proceeds to step S41, at which it is examined whether or not there is print data having a value "11" or greater. If YES, the process proceeds to step S42, at which a dot is printed at the corresponding position (main address). Next, at step S43, it is examined whether or not there is print data having a value "1111 (maximum quinary value)". If YES, the process proceeds to step S44, at which it is determined whether or not it is ready to print a dot corresponding to 720 dpi resolution. If YES, the process proceeds to step S45, at which a dot is printed at the corresponding position (subaddress).

Next, at step S46, it is determined whether or not printing for one scanning of printhead has been completed. If YES, the process proceeds to step S47, at which carriage returning is performed to return the carriage unit 2 to the home position. Then the paper-feed motor 305 is driven, to feed the print sheet by the print width of the printhead. Thus, an image of the print width has been printed by the printhead which discharges ink of respective colors. Then the process proceeds to step S48, at which it is determined whether or not printing for one page of the print medium has been completed. If NO, the process returns to step S31, at which print data for the next print-scanning is formed and stored into the print buffers for the respective colors. When the image printing for one page has been completed, the process proceeds to step S49, at which the print paper on which the image has been printed is discharged, and the process ends.

According to the first embodiment, the number of tone levels of an image to be printed can be changed by a user's selecting the ink cartridge 1 in accordance with the image to be printed and the corresponding print medium.

Second Embodiment

In the first embodiment, as shown in FIG. 13, the type of the ink cartridge 1 is determined upon printing, and a print mode corresponding to the type of the ink cartridge 1 is automatically set by the printer driver of the host 100. In this way, control is performed such that the color processing of the printer driver is interrelated to the processing of the controller.

In this embodiment, a print mode corresponding to the user's purpose is selected by the user's arbitrarily setting on the display screen of the host 100 so that the set print mode is certainly from the user's purpose.

Figure 16:
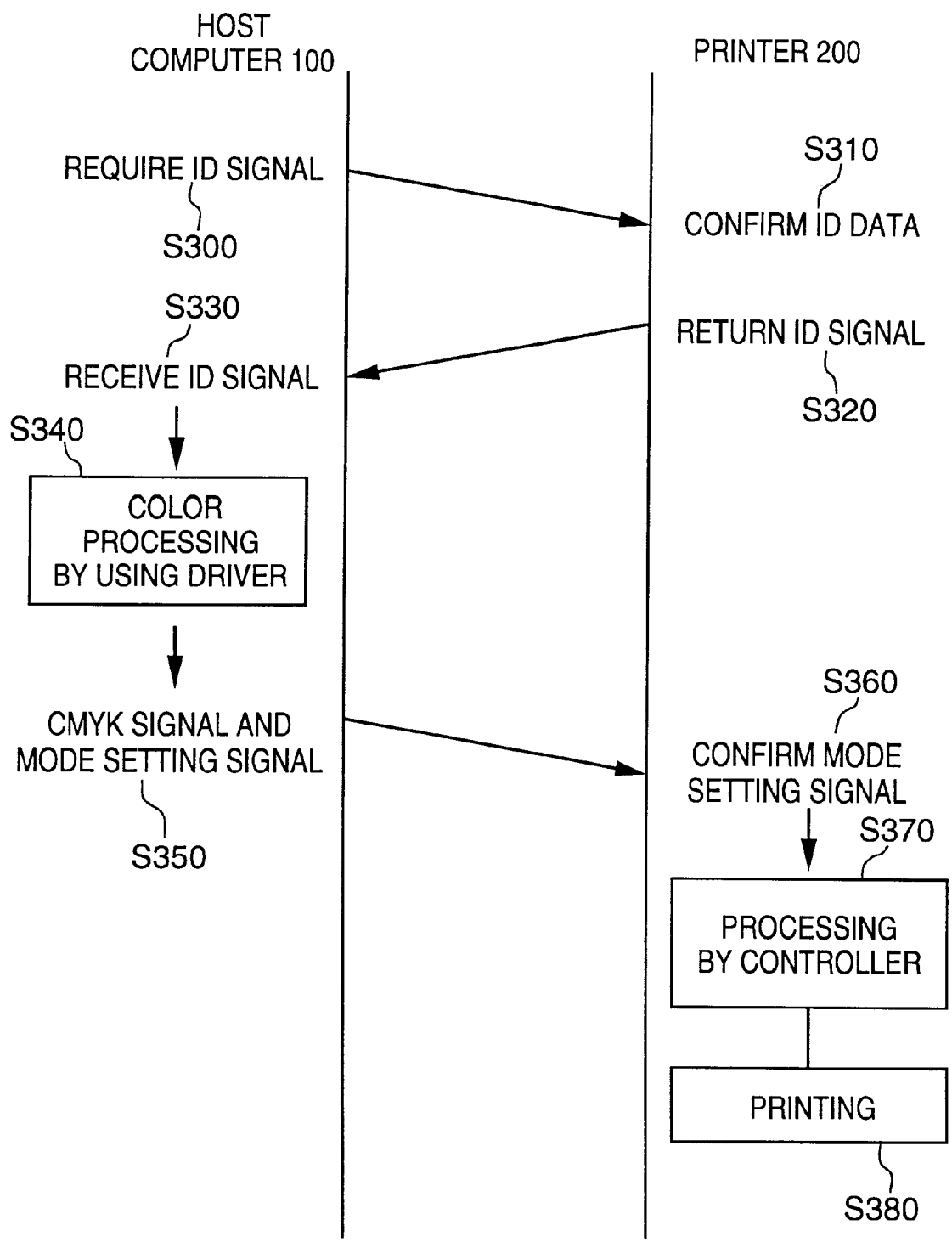
FIG. 16 is a timing chart explaining information transfer/reception between the host 100 and the printer 200 in a case where various print modes are manually set from the host 100, according to a second embodiment of the present invention.

FIG. 16 is a timing chart explaining information transfer/reception between the host 100 and the printer 200 in a case where various print modes are manually set from the host 100, according to this embodiment of the present invention.

The operation shown in FIG. 16 is as follows. The host 100 inquires of the printer 200 about the type of the attached ink cartridge 1 (S300). The printer 200 reads the ID of the ink cartridge 1 and determines the type of the ink cartridge (S310), and returns the ID to the host 100 (S320). The host 100 receives the ID (S330), performs color processing on image data by the printer driver, in accordance with the colors of ink contained in the ink cartridge (S340), and sends the generated color signals (CMYK density signals) and a print mode signal to the printer 200 (S350). The printer 200 receives these signals, performs bitmapping and the like (S370), and performs printing (S380).

Figure 17:
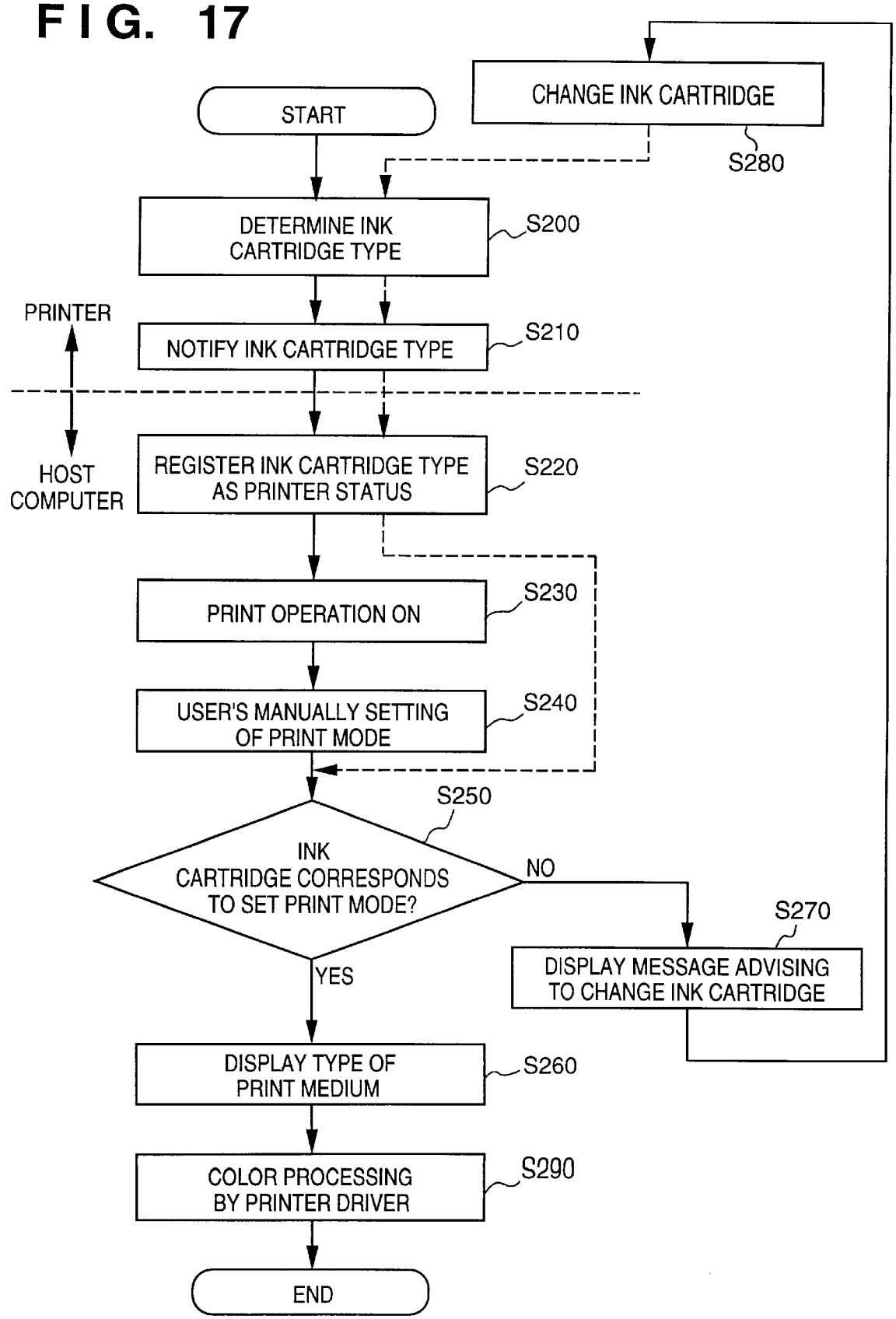
FIG. 17 is a flowchart showing print-mode setting processing according to the second embodiment of the present invention.

FIG. 17 is a flowchart showing print-mode setting processing according to the second embodiment. This processing is premised on bidirectional communication of sending/receiving various information between the host 100 and the printer 200.

First, at step S200, when the power of the printer 200 is turned on and the ink cartridge 1 is attached to the printer 200, the type of the ink cartridge 1 is determined based on the ID of the ink cartridge, similar to the first embodiment. Next, at step S210, an ID signal indicating the result of determination at step S200 is notified to the host 100. The processing at steps S200 and S210 is made on the printer side. The following processing is made on the host 100 side.

At step S220, based on the ID signal received from the printer 200, the type of the ink cartridge 1 currently attached to the printer 200 is registered with the type of the printer 200 and the like, as the status of the printer 200. At step S230, a print operation is turned ON, and at step S240, the user manually sets a print mode by using, e.g., user interface (UI) display as shown in FIG. 18, displayed on the display screen of the host 100.

In the present embodiment, the print modes correspond to the ID's of the ink cartridge. That is, a normal mode corresponds to ID1; a pictorial mode 1, ID2; a pictorial mode 2, ID3; and monochrome mode, ID0.

As described in the first embodiment, the respective ink cartridges correspond to the respective print modes.

Accordingly, at step S250, it is determined whether or not the attached ink cartridge corresponds to the set print mode, by examining the type of the ink cartridge registered at step S220.

If the attached ink cartridge corresponds to the set print mode, the process proceeds to step S260, at which the user is advised to set a print medium corresponding to the print mode. In the present embodiment, the normal mode is applicable to any of normal paper, coated paper and pictorial paper. Accordingly, if the normal mode is set, a message as shown in FIG. 19 is displayed on the display screen of the host 100.

On the other hand, if the attached ink cartridge does not correspond to the set print mode, the process proceeds to step S270, at which a message is displayed to advise the user to change the ink cartridge corresponding to the set print mode. For example, in a case where the currently attached ink cartridge is for the normal mode (ID=1) but the pictorial mode 1 has been set as the print mode, a message as shown in FIG. 20 is displayed on the display screen of the host 100, to advise the user to change the ink cartridge for an appropriate ink cartridge (ID=2). Then at step S280, as the user changes the ink cartridge into the appropriate ink cartridge on the printer 200 side, it is determined whether or not the attached ink cartridge corresponds to the set print mode, through the above-described steps S200, S210, S220 and S250 as shown in the broken line. In this manner, as the ink cartridge and print medium corresponding to the set print mode have been set, the process proceeds to step S290, at which the color processing by the printer driver 103 is started. Thereafter, processing similar to that in the first embodiment is performed.

According to the present embodiment, image formation is performed in a print mode corresponding to the user's purpose, and incorrect or undesirable printing due to print-mode setting error or the like can be prevented.

Note that if the normal mode or the monochrome mode is set as the print mode, as it does not limit the type of print medium, the processing at step S260 may be omitted. This reduces the number of warning messages, thus providing more user-friendly user interface (UI).

Figure 21:
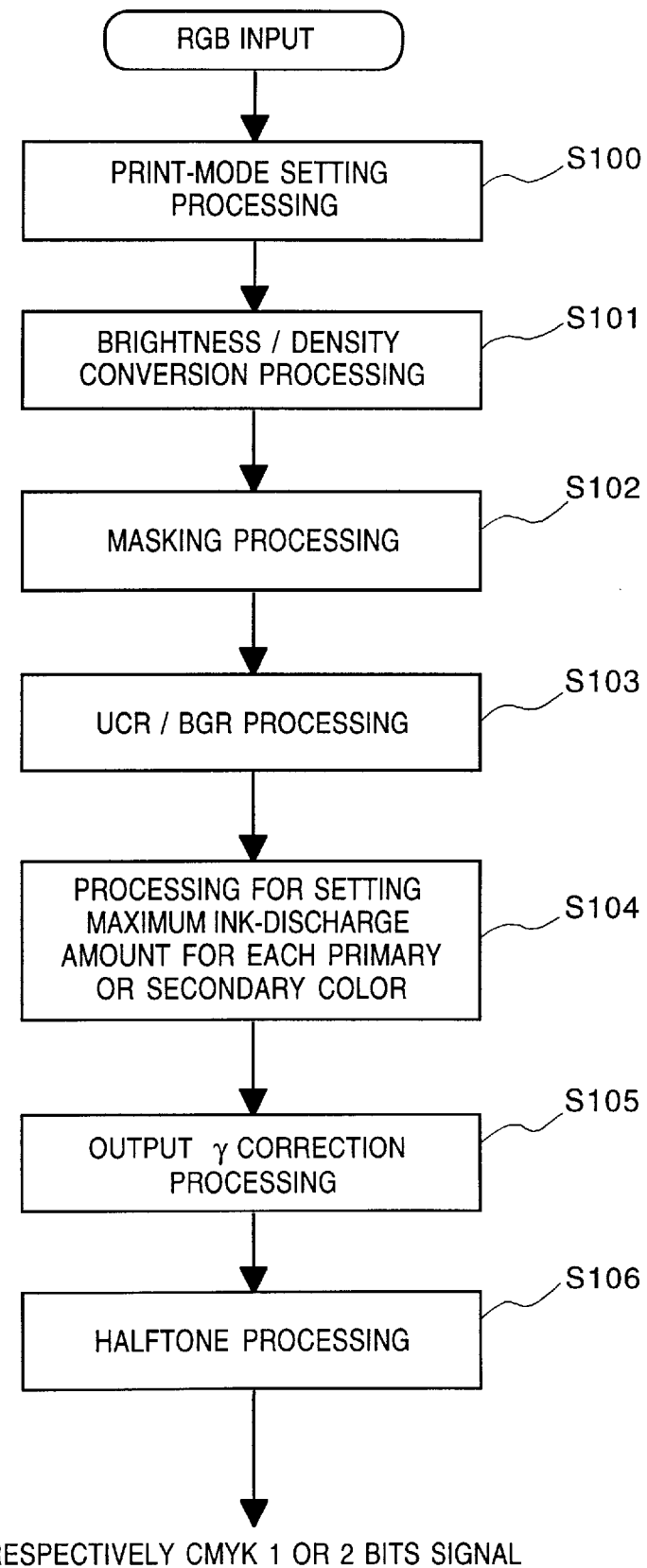
FIG. 21 is a flowchart showing the image processing according to the second embodiment of the present invention.

FIG. 21 is a flowchart showing the image processing executed by an image processing module of the printer driver 103, as described with reference to FIG. 6, according to the second embodiment. In FIG. 21, the steps corresponding to those in FIG. 6 have the same step numbers, and the explanation of these steps will be omitted. In this example, a print mode is set by using the above-described UI at step S100, and image processing is performed in correspondence with the set print mode.

Figure 22:
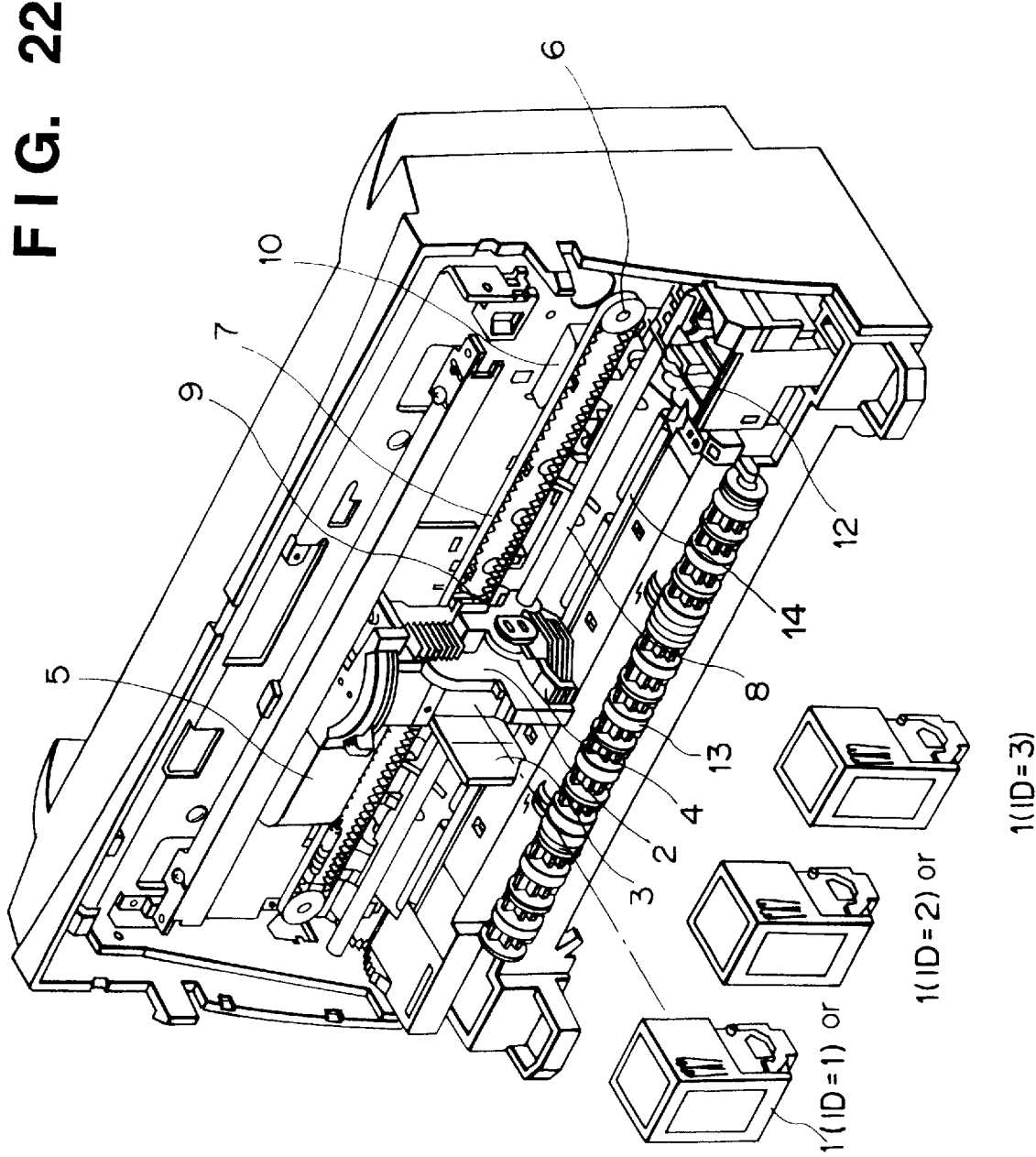
FIG. 22 is a perspective view showing the ink cartridges 1 having different ID's and the printer 200 in FIG. 2.
Figure 23:
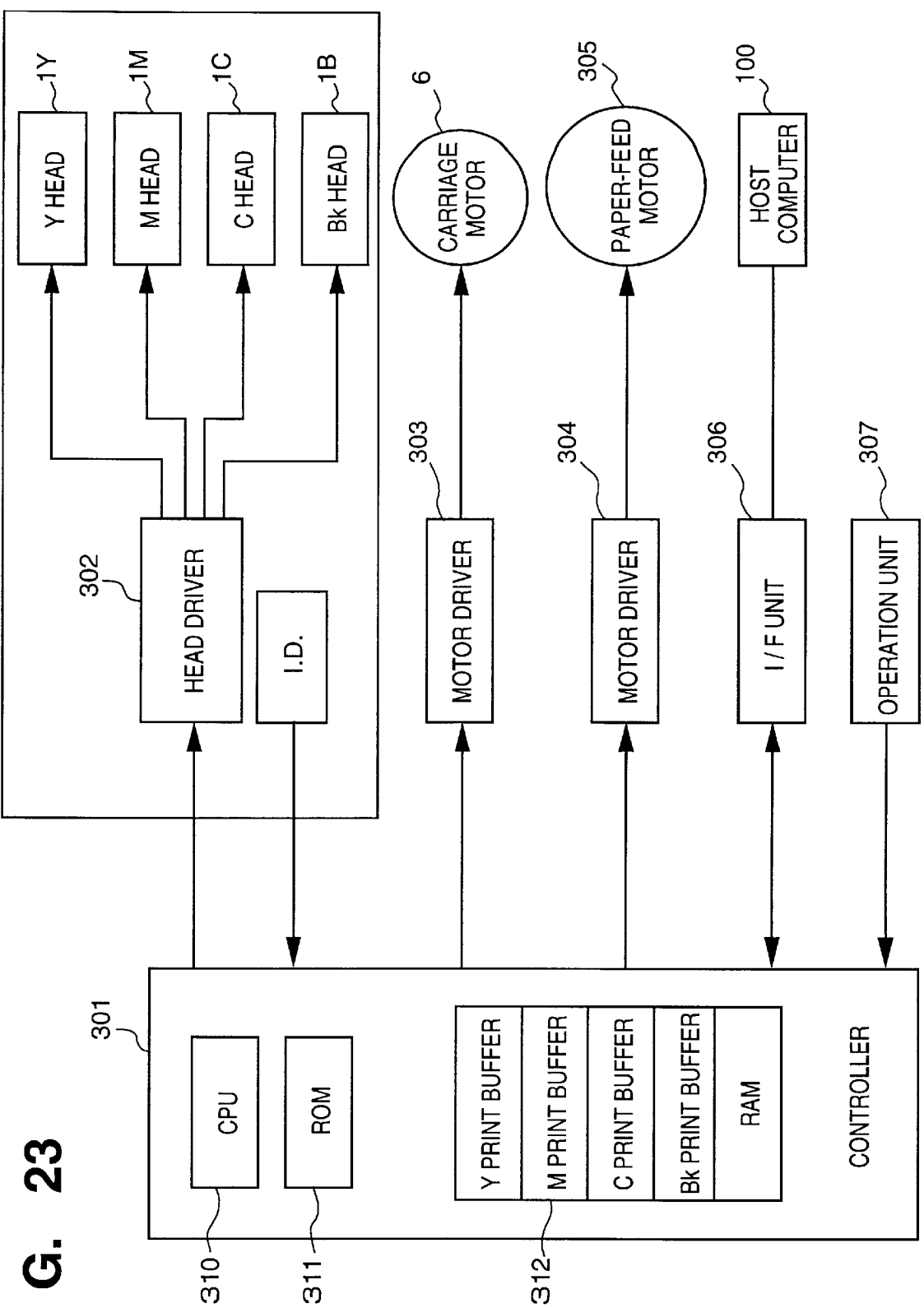
FIG. 23 is a block diagram showing the control construction of the printer 200 as shown in FIG. 12, where the ID of the ink cartridge 1 is supplied to a control unit 302.

FIG. 22 is a perspective view showing the ink cartridges 1 having different ID's and the printer 200 in FIG. 2. FIG. 23 is a block diagram showing the control construction of the printer 200 as shown in FIG. 12, where the ID of the ink cartridge 1 is supplied to a control unit 302.

Note that in a case where the host 100 and the printer 200 are connected via a uni-directional communication interface such as a centronics interface and the printer 200 cannot make various determinations and perform print control, it can be arranged such that a print mode corresponding to a predetermined type of an ink cartridge and the like are set by the printer driver 103 of the host 100, based on manually-input instructions, and the printer 200 is instructed to perform print processing in correspondence with the set print mode.

On the other hand, the controller 201 of the printer 200 automatically determines the type of the attached ink cartridge 1, similar to the first embodiment, and automatically sets a print mode in the printer 200, based on the determined type of the ink cartridge. Next, the controller 201 receives instruction based on the manually-set print mode from the host computer 100. Then, if the condition of the received print mode corresponds to the type of the currently-attached ink cartridge 1 and the print mode in the printer 200, the controller 201 performs print processing.

Figure 24A:
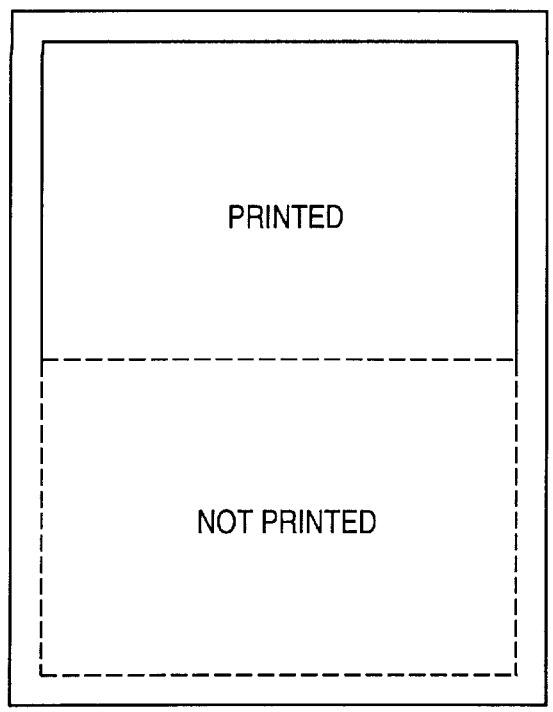
FIGS. 24A and 24B are examples of images printed for notifying that correspondence between an attached ink cartridge and a set print mode is improper.
Figure 24B:
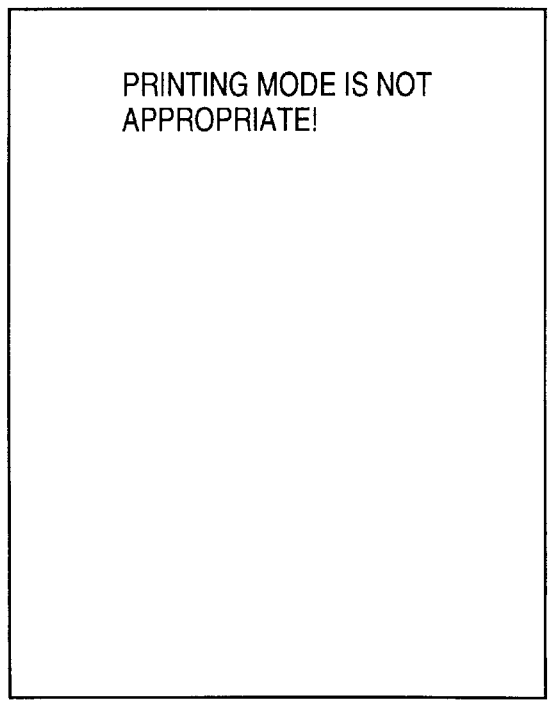

However, if the condition of the received print mode does not correspond to the type of the ink cartridge and the print mode in the printer 200, an error message is displayed on the operation unit of the printer 200 to notify the user of the mismatch between the manually-set print mode and the type of the ink cartridge 1, otherwise, an image, indicating that the manually-set print mode does not correspond to the type of the ink cartridge 1, is printed on a print medium. This image may be the upper half of an image to be printed, as shown in FIG. 24A, or a predetermined message as shown in FIG. 24B. By this notification, the user can check the ink cartridge attached to the printer 200 and set the print mode again. This prevents image printing in a print mode inappropriate to an attached ink cartridge, thus reducing erroneous printing.

Note that the image printed on the print medium, to notify the user of the mismatch between the attached ink cartridge and the set print mode, is not limited to the image as shown in FIG. 24, so far as the user can notice the mismatch.

As various types of ink cartridges having different ID's are available, and various types of print media appropriate to various types of images are available, to obtain a high-quality image, the user has to select an ink cartridge and a print medium appropriate to the type of image to be outputted. To perform this selection, the user has to memorize available types of ink cartridges and ink characteristics corresponding to these ink cartridges, and further, the user has to memorize image types suitable for the respective ink cartridges.

However, if the user forgets or incorrectly remembers the above information, the user cannot perform proper selection upon printing. This may result in image output in poor image quality, wasting the print medium and ink. Further, the above selection procedure requires the user to make very troublesome operation, therefore, there is a need for improvement in this selection procedure from the point of providing a user-friendly interface.

In consideration of the above situation, the present embodiment provides a user interface which enables to easily set appropriate print mode and print medium, in accordance with the type of the attached ink cartridge, on the premise of exchanging information by bidirectional communication between the host 100 and the printer 200.

Figure 25:
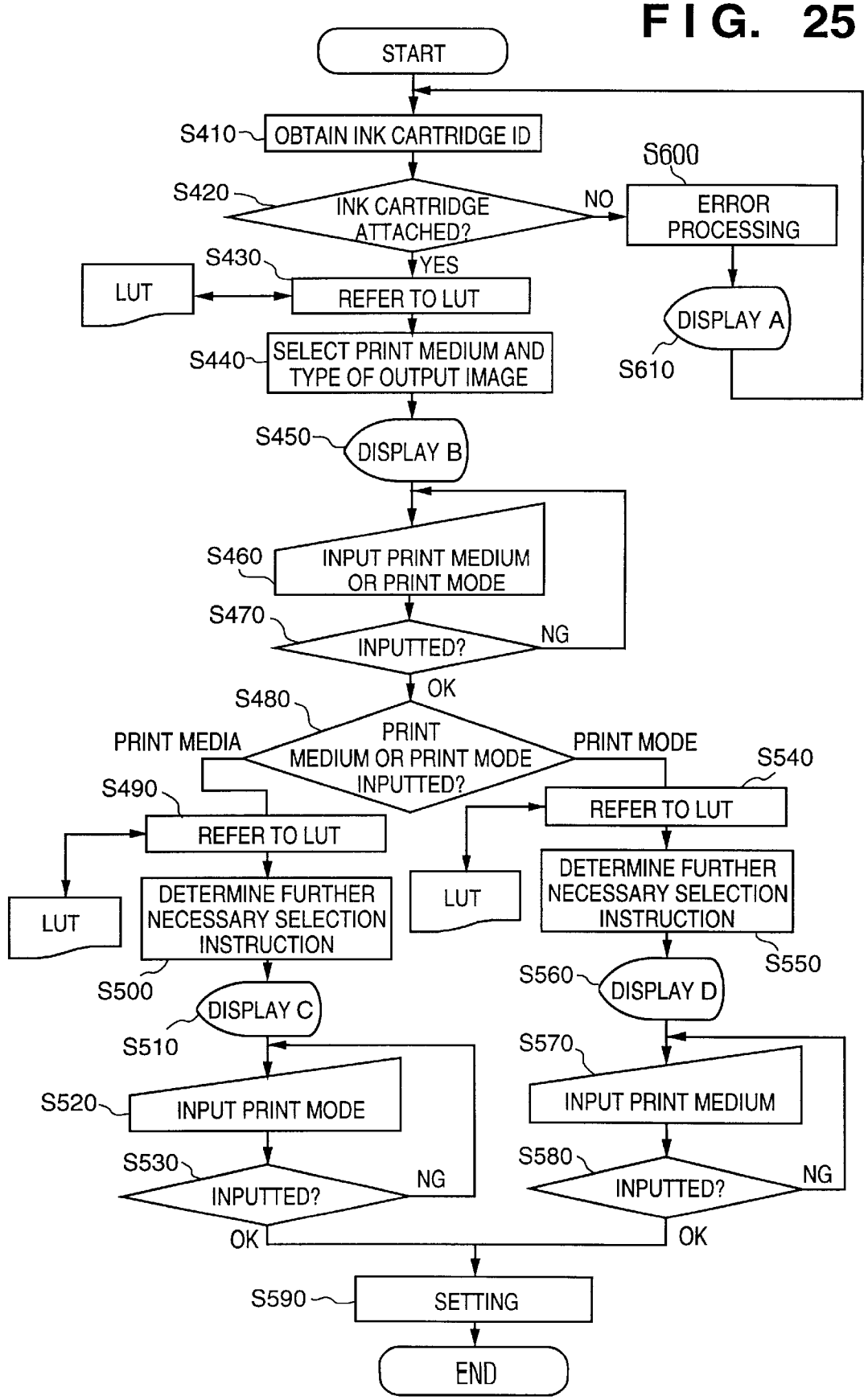
FIG. 25 is a flowchart showing processing of setting a print mode and a print medium in accordance with the type of attached ink cartridge.

FIG. 25 is a flowchart showing processing of setting a print mode and a print medium in accordance with the type of attached ink cartridge. Note that the program to execute this processing is a part of the application 102 or the printer driver 103 which run under the OS 101 in the host 100. After this program is supplied from a floppy disk or a CD-ROM, it resides in a memory of the host 100, hard disk or the like.

At step S410, the ID of the attached ink cartridge 1 is obtained from the printer 200. At step S420, it is determined whether or not the ink cartridge 1 is attached. If the ink cartridge 1 is not attached, the ID obtained at step S410 has a meaningless value, or a value indicating ink-cartridge unattached status which is predefined between the host 100 and the printer 200. Accordingly, if it is determined that the ink cartridge 1 is not attached, the process proceeds to step S600, at which a predetermined error processing is performed, further the process proceeds to step S610, at which a message (display A) as shown in FIG. 26A is displayed on the display screen of the host 100, to advise the user to attach the ink cartridge 1. Thereafter, the process returns to step S410.

On the other hand, if it is determined at step S420 that the ink cartridge 1 is attached, the obtained ID number is discriminated, and the process proceeds to step S430, at which an LUT, stored in a non-volatile memory such as an EEPROM of the host 100, is referred to. The LUT shows appropriate combinations of the ink cartridge ID's, types of output image and the types of print media.

FIG. 27 shows the above LUT. In FIG. 27, cells containing a symbol "○" indicate appropriate combinations of ink cartridge ID's, the types of output image and the types of print media. Blank cells show no appropriate combination. The cells "HQ", "PHOTO1" and "PHOTO2" respectively represent a high-contrast line drawing, a high-contrast natural picture, and a pastel natural picture, as the types of output images.

Next, at step S440, in accordance with the ID of the attached ink cartridge and the result of reference to the LUT, print medium-media and type(s) of output image (print mode(s)) appropriate to printing by using the attached ink cartridge are selected. At step S450, in accordance with the result of selection, a selection menu (display B) as shown in FIG. 26B is displayed on the display screen of the host 100. At steps S460 to S470, instruction input to select a print medium and a type of output image (print mode) is waited. When the instruction to select a print medium and a type of output image has been inputted, the process proceeds to step S480, at which the instruction input is examined. If the input instructs to select a print medium, the process proceeds to step S490, while if the input instructs to select a type of output image (print mode), the process proceeds to step S540.

At step S490, the LUT is referred to again, and at step S500, in accordance with the selected instruction at step S460, it is determined what selection instruction is necessary in addition to the above selection instruction, and based on the determination, a selection menu (display C) as shown in FIG. 26C is displayed on the display screen of the host 100. The selection menu includes only the types of output images (print modes). At steps S520 to S530, instruction input to select a type of output image (print mode) is awaited. When a type of output image is selected, the process proceeds to step S590.

At step S540, the LUT is referred to again, and at step S550, in accordance with the selected instruction at step S460, it is determined what selection instruction is necessary in addition to the above selection instruction, and based on the determination, a selection menu (display D) as shown in FIG. 26D is displayed on the display screen of the host 100. The selection menu includes only the print media. At steps S570 to S580, instruction input to select a print medium is awaited. When a print medium is selected, the process proceeds to step S590.

Thus, when the selection-instructions have been inputted, in accordance with the input instructions, setting is made based on the type of print medium and the type of output image at step S590. Thereafter, the process ends.

Note that in the present embodiment, appropriate print medium and type of output image are selected, in accordance with the type of attached ink cartridge. However, this does not pose any limitation on the present invention. For example, it seems that the improvement in tonality representation in printing with diluted ink has no remarkable effect on an image having a small number of tone levels such as character-based document and bar graph; rather, when a high-density image is printed with diluted ink, if a print medium of low ink absorptivity is used, ink droplets of YMC colors, discharged onto the print medium, overflow from the surface of the print medium. Accordingly, the setting may be performed such that the type of ink (i.e., the type of ink cartridge) used by the printhead is selected by the user in accordance with the type of image to be outputted and print medium to be used.

Further, the above image processing may be performed such that an achromatic color component is separated from print data, and a high brightness portion of the achromatic color component is represented by black data obtained as mixture of yellow, magenta and cyan color data, while a low brightness portion of the achromatic color component is represented by black component data. This enables tonality representation with respect to an achromatic color area by using black ink (processed black ink) obtained as mixture of YMC ink and black ink. This reduces graininess at a high brightness area by using the process black ink, while obtaining high image density by using black ink at a low brightness area.

Note that the above embodiments have been described as print processing partially performed on a host side and partially performed on a printer side, however, this does not pose any limitation on the present invention. It may be arranged such that most of the print processing is performed by the host, or processing load on the printer is increased, in accordance with processing capability of the host and intelligence function of the printer.

The embodiment described above has exemplified a printer, which comprises means (e.g., an electrothermal transducer, laser beam generator, and the like) for generating heat energy as energy utilized upon execution of ink discharge, and causes a change in state of an ink by the heat energy, among the ink-jet printers. According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type or a continuous type. Particularly, in the case of the on-demand type, the system is effective because, by applying at least one driving signal, which corresponds to printing information and gives a rapid temperature rise exceeding film boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558, 333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

In addition, an exchangeable chip type printhead which can be electrically connected to the apparatus main unit and can receive an ink from the apparatus main unit upon being mounted on the apparatus main unit or a cartridge type printhead in which an ink tank is integrally arranged on the printhead itself can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a print medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

Note that in the above embodiments, in the host, multi-valued image data is separated into color component data corresponding to ink of respective colors, and binarization or multivalue processing is performed on the respective color component data. However, this does not pose any limitation on the present invention. The printer may take over the above processing function. Further, in the above embodiments, the host outputs print codes to the printer, however, the print data may be bitmapped in the host and then transferred to the printer.

Further, color property in the above embodiments indicates the intensity of color development of ink itself or the intensity of color development in an image printed on a print medium, and in case of an achromatic color, indicates its brightness. In this meaning, the color property is the pigment (dye) concentration of ink when dyes and pigments of the same material are used. Further, in case of comparing color properties in images printed on print media, the color properties are optical reflection densities or maximum chromaticness of approximately the same color hue. In this case, excellent color property means an object having good color development.

As described above, according to the embodiments, printing by using various color inks having different pigment concentrations can be performed by changing ink cartridges or ink tanks for a printer. Further, with the change of pigment concentrations of ink due to change of ink cartridge, a maximum amount of coloring material to be discharged onto a print medium is determined by changing an ink discharge amount in printing or a maximum ink discharge amount, in accordance with the combination of pigment concentrations of ink contained in the ink cartridge. This enables printing in accordance with the type of print medium to be used.

Further, in the above embodiments, in case of printing with low pigment concentration ink, color separation is performed, by pixel, into primary and secondary color components, and a maximum ink-discharge amount is determined with respect to each of primary and secondary colors, in accordance with the type of a print medium to be used, instead of simply increasing the maximum ink-discharge amount of low pigment concentration ink according to the concentration.

Even though low pigment concentration ink is used, this function obtains a printed image where primary and secondary colors have optical reflection densities approximately the same as those in printing by using high pigment concentration ink. Further, even if coloring materials of different pigments are used, the amount of pigment per a unit area on the print medium can be changed by exchanging the ink cartridge or ink tank for another one. More specifically, the maximum densities can be made approximately the same as those in printing by using high pigment concentration ink with reduced graininess by performing ink discharge so as to obtain approximately the same pigment concentration per the unit area.

Further, according to the above embodiments, an ink-discharge amount to be discharged onto a print medium is controlled in consideration of different ink absorptivities of different types of print media. This prevents occurrence of blur on a printed image on a print medium, and reduces running cost. In this manner, as an ink-discharge amount is changed in accordance with pigment concentrations of color ink, and an ink-discharge amount for each color component is precisely controlled, high quality image can be printed by using even a print medium on which ink blur may easily occur or a print medium of a low ink absorptivity.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides the aforesaid functions according to the above embodiments being realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, the CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. An ink-jet printer having an image formation unit capable of forming an image by using different types of ink, comprising:

identifying means for identifying a type of ink which has been set in said printer;

setting means for setting a print mode based on an instruction manually inputted by a user;

judgement means for judging whether or not a combination of the type of ink and the print mode is recommendable;

notifying means for notifying with a message indicating whether the combination is not recommendable; and color-processing means for performing color-processing based on the print mode set by said setting means.

2. The ink-jet printer according to claim 1, wherein said image formation unit includes a carriage carrying one of plural exchangeable ink cartridges containing the different types of ink, each exhibiting particular color property.

3. The ink-jet printer according to claim 2, wherein said ink cartridges include an ink cartridge where a printhead and an ink tank are separable from each other.

4. The ink-jet printer according to claim 2, wherein said ink cartridges include an ink cartridge where a printhead and an ink tank containing ink are integrated.

5. The ink-jet printer according to claim 1, wherein said color-processing means controls an ink-discharge amount in accordance with the print mode.

6. The ink-jet printer according to claim 1, wherein said color-processing means performs resolution conversion in accordance with the print mode.

7. The ink-jet printer according to claim 1, wherein said color-processing means performs binarization processing and/or multivalue processing in accordance with the print mode.

8. The ink-jet printer according to claim 1, further comprising a controller and a driver which perform bidirectional communication, wherein said identifying means is included in said controller, and wherein said setting means and said color-processing means are included in said driver.

9. The ink-jet printer according to claim 1, wherein the different types of ink present first color-development intensities in ink itself different from second color-development intensities in printed images on print media, however, the first and second color development intensities have approximately the same color hue.

10. The ink-jet printer according to claim 1, wherein each of the different types of inks exhibits a particular color property.

11. An ink-jet printer having an image formation unit capable of forming an image by using different types of ink, comprising:

identifying means for identifying a type of ink;

notifying means for notifying a user of selectable print modes based on the type of ink identified by said identifying means;

setting means for selectively setting one of the print modes notified by said notifying means, based on an instruction manually inputted by the user;

color-processing means for performing color-processing on input color image data based on the print mode set by said setting means; and an ink-jet printing unit which performs image formation by using the ink, based on the color image data color-processed by said color-processing means.

12. The ink-jet printer according to claim 11, wherein said setting means sets the print mode in accordance with the instruction manually inputted by the user, regarding a type of print medium.

13. The ink-jet printer according to claim 11, wherein said ink-jet printing unit includes a carriage carrying one of plural exchangeable ink cartridges containing the different types of ink, each exhibiting particular color property.

14. The ink-jet printer according to claim 13, wherein said ink cartridges include an ink cartridge where a printhead and an ink tank containing ink are integrated.

15. The ink-jet printer according to claim 13, wherein said ink cartridges include an ink cartridge where a printhead and an ink tank are separable from each other.

16. The ink-jet printer according to claim 11, wherein said color-processing means controls an ink-discharge amount in accordance with the print mode.

17. The ink-jet printer according to claim 11, wherein said color-processing means performs resolution conversion in accordance with the print mode.

18. The ink-jet printer according to claim 11, wherein said color-processing means performs binarization processing or multivalue processing in accordance with the print mode.

19. The ink-jet printer according to claim 11, wherein said ink-jet printing unit performs image formation by using the different types of ink, each exhibiting a particular color property.

20. An image processing method comprising:
- an identifying step of identifying a type of ink which has been set in an ink-jet printer;
- a setting step of setting a print mode based on an instruction manually inputted by a user;
- a judgement step of judging whether or not a combination of the type of ink and the print mode is recommendable;
- a notifying step of notifying with a message indicating whether the combination is not recommendable; and
- a color-processing step of performing color processing based on the print mode set in said setting step.

21. An image processing method comprising:
- an identifying step of identifying a type of ink;
- a notifying step of notifying a user of selectable print modes based on the type of ink identified in said identifying step;
- a setting step of selectively setting one of the print modes notified in said notifying step, based on an instruction manually inputted by the user; and
- a color-processing step of performing color-processing on input color image data based on the print mode set in said setting step.

22. A computer-readable memory containing image-processing program codes, comprising:
- codes of executing processing for identifying a type of ink which has been set in an ink-jet printer;
- codes of executing processing for setting a print mode based on an instruction manually inputted by a user;
- codes of executing processing for judging whether or not a combination of the type of ink and the print mode is recommendable;
- codes of executing processing for notifying with a message indicating whether the combination is not recommendable; and
- codes of executing processing for performing color-processing based on the set print mode.

23. A computer-readable memory containing image-processing program codes, comprising:
- codes of executing processing for identifying a type of ink;
- codes of executing processing for notifying a user of selectable print modes based on the identified type of ink;
- codes of executing processing for selectively setting one of the notified print modes, based on an instruction manually inputted by the user; and
- codes of executing processing for performing color-processing on input color image data based on the set print mode.

* * * * *

UNITED STATES PATENT AND TRADEMARK OFFICE
CERTIFICATE OF CORRECTION

PATENT NO. : 6,145,950
DATED : November 14, 2000
INVENTOR(S) : Ohtsuka et al.

It is certified that error appears in the above-identified patent and that said Letters Patent is hereby corrected as shown below:

Title page,
Item [56] References Cited,
U.S. PATENT DOCUMENTS, the following should be inserted:
-- 4,630,076   12/1986   Yoshimura.
   5,142,374   8/1992    Tajika et al.
   5,623,294   4/1997    Takizawa et al. --.

FOREIGN PATENT DOCUMENTS, "7052390" should read -- 7-52390 --, "7144419" should read -- 7-144419 --, and -- 62-161541   7/1987   Japan -- should be inserted.

Column 7,
Line 7, "typical" should read -- a typical --.

Column 10,
Line 37, "2 bits." should read -- 1 bit. --.
Line 41, "2 bit." should read -- 2 bits. --.

Column 21,
Line 24, "medium-media" should read -- medium (media) --.

Signed and Sealed this

Eleventh Day of December, 2001

Attest:

NICHOLAS P. GODICI
*Attesting Officer*   *Acting Director of the United States Patent and Trademark Office*